(12) United States Patent
Mitsutani

(10) Patent No.: US 8,666,572 B2
(45) Date of Patent: Mar. 4, 2014

(54) CHARGING CONTROL APPARATUS FOR POWER STORAGE DEVICE AND METHOD FOR CONTROLLING CHARGING OF POWER STORAGE DEVICE

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 404 days.

(21) Appl. No.: 12/672,342

(22) PCT Filed: Sep. 2, 2008

(86) PCT No.: PCT/JP2008/065715
§ 371 (c)(1),
(2), (4) Date: Feb. 5, 2010

(87) PCT Pub. No.: WO2009/034872
PCT Pub. Date: Mar. 19, 2009

(65) Prior Publication Data
US 2010/0318250 A1  Dec. 16, 2010

(30) Foreign Application Priority Data
Sep. 10, 2007 (JP) ................................. 2007-234421

(51) Int. Cl.
*H02J 7/00* (2006.01)
*B60L 9/00* (2006.01)
*B60L 1/00* (2006.01)

(52) U.S. Cl.
USPC ............................................. 701/22; 701/99

(58) Field of Classification Search
USPC .............. 701/22, 36, 99, 31.4, 34.4; 320/109, 320/111; 180/65.27, 65.29
See application file for complete search history.

(56) References Cited

U.S. PATENT DOCUMENTS 5,548,200 A * 8/1996 Nor et al. ........................ 320/109
5,563,491 A * 10/1996 Tseng ............................. 320/109

(Continued)

FOREIGN PATENT DOCUMENTS

EP   0 921 024 A2   6/1999
JP   U 5-11701      2/1993

(Continued)

OTHER PUBLICATIONS

"Japan Electric Vehicle Association Standard, Electric Vehicle Conductive Charging System, General Requirements," Japan Electric Vehicle Association, JEVS G 109-2001, Mar. 29, 2001 (with translation).

(Continued)

*Primary Examiner* — Jason Holloway
(74) *Attorney, Agent, or Firm* — Oliff PLC

(57) ABSTRACT

In an external charging mode of a plug-in hybrid vehicle, electric power from an external power supply electrically connected to a connector is converted and supplied to a power line electrically connected to a battery and an electric air-conditioning device. If charge allowable power of the battery is smaller than or equal to a prescribed value when the electric air-conditioning device is operated, a DFR is opened to stop electric power supply from the external power supply and drive the electric air-conditioning device by electric power of the battery. As a result, even if the consumed power of the electric air-conditioning device is suddenly decreased, the inflow of surplus electric power that cannot be absorbed by the battery from the external power supply can be prevented.

20 Claims, 12 Drawing Sheets

(56) References Cited

U.S. PATENT DOCUMENTS

| | | | |
|---|---|---|---|
| 5,595,064 A * | 1/1997 | Ikeda et al. | 62/126 |
| 5,656,916 A * | 8/1997 | Hotta | 320/160 |
| 6,963,186 B2 * | 11/2005 | Hobbs | 320/128 |
| 2004/0169489 A1 * | 9/2004 | Hobbs | 320/104 |
| 2005/0007049 A1 | 1/2005 | Kim | |
| 2005/0189894 A1 | 9/2005 | Komiyama et al. | |
| 2005/0269880 A1 * | 12/2005 | Konishi | 307/10.7 |
| 2006/0021809 A1 | 2/2006 | Xu et al. | |
| 2006/0028178 A1 * | 2/2006 | Hobbs | 320/128 |
| 2008/0180058 A1 * | 7/2008 | Patel et al. | 320/109 |
| 2008/0271937 A1 * | 11/2008 | King et al. | 180/165 |
| 2009/0012664 A1 * | 1/2009 | Christ | 701/22 |
| 2009/0174365 A1 * | 7/2009 | Lowenthal et al. | 320/109 |
| 2010/0013436 A1 * | 1/2010 | Lowenthal et al. | 320/109 |
| 2011/0118919 A1 * | 5/2011 | Park et al. | 701/22 |

FOREIGN PATENT DOCUMENTS

| | | |
|---|---|---|
| JP | A 8-65814 | 3/1996 |
| JP | A 8-65815 | 3/1996 |
| JP | A 2000-78701 | 3/2000 |
| JP | A 2001-63347 | 3/2001 |
| JP | A 2002-371880 | 12/2002 |
| JP | A-2004-072892 | 3/2004 |
| WO | WO 2007/037240 A1 | 4/2007 |

OTHER PUBLICATIONS

"SAE Electric Vehicle Conductive Charge Coupler," SAE Standards, SAE International, Nov. 2001.

International Search Report issued for International Application No. PCT/JP2008/065715 on Dec. 9, 2008 (with translation).

Extended European Search Report issued in European Patent Application No. 08830463.9 dated Aug. 17, 2011.

* cited by examiner

CHARGING CONTROL APPARATUS FOR POWER STORAGE DEVICE AND METHOD FOR CONTROLLING CHARGING OF POWER STORAGE DEVICE

TECHNICAL FIELD

The present invention relates to a charging control apparatus for a power storage device and a method for controlling charging of a power storage device. More particularly, the present invention relates to a technique for driving a vehicle-mounted electric load when a power storage device mounted on a vehicle is charged by electric power supplied from a power supply external to the vehicle.

BACKGROUND ART

Conventionally, a vehicle such as a hybrid vehicle, an electric vehicle and a fuel cell vehicle using an electric motor as a driving source has been known. Such a vehicle is equipped with a power storage device (energy storage device) such as a battery in order to store electric power to be supplied to the electric motor. Electric power generated during regenerative braking and electric power generated by a generator mounted on the vehicle are stored in the battery.

Recently, in the vehicle as described above, a configuration has been proposed in which the power storage device is charged by a power supply external to the vehicle (that will also be simply referred to as "external power supply" hereinafter) such as a household power supply. Specifically, an outlet provided at a house is coupled to a connector provided on the vehicle by a cable, so that the power storage device (battery) of the vehicle is charged with electric power supplied from the household power supply. The vehicle in which the power storage device such as the battery mounted on the vehicle can be charged by the power supply external to the vehicle will also be referred to as "plug-in vehicle" hereinafter.

The standard for the plug-in vehicle is defined by "Electric Vehicle Conductive Charging System, General Requirements" (Non-Patent Document 1) in Japan, and by "SAE Electric Vehicle Conductive Charge Coupler" (Non-Patent Document 2) in the United States of America.

In such a plug-in vehicle, it has been proposed to operate an electric air conditioner at the time of charging by the external power supply (that will also be referred to as "external charging" hereinafter) and carry out pre-air-conditioning such as preheating or precooling during which the vehicle interior is air-conditioned in advance before the vehicle starts to travel (for example, Patent Documents 1 to 4). As a result of such pre-air-conditioning, the vehicle interior has already been air-conditioned when the vehicle starts to travel. Therefore, the electric power consumed for air conditioning while the vehicle is traveling is suppressed. Thus, the electric power of the power storage device used for traveling of the vehicle can be maximized.

For example, Japanese Patent Laying-Open No. 8-65814 (Patent Document 1) and Japanese Patent Laying-Open No. 8-65815 (Patent Document 2) disclose a charging control apparatus for an electric vehicle in which electric power supplied from an external power supply is divided into electric power to be consumed by an electric air conditioner and a charging current of a vehicle-mounted battery of the electric vehicle at the time of external charging of the battery.

In particular, Patent Document 1 discloses charging control for carrying out pre-air-conditioning while giving priority to charging of the battery at the time of external charging. On the other hand, Patent Document 2 discloses charging control in which, at the time of external charging, when an instruction for preferentially operating the electric air conditioner is generated, electric power that allows the electric air conditioner to be operated until rated electric power is reached is allocated to the electric air conditioner, and the battery is charged with the remaining electric power.

Furthermore, Japanese Patent Laying-Open No. 2001-63347 (Patent Document 3) discloses an air-conditioning control system for a vehicle in which electric power supplied from an external power supply is used to operate a pre-air-conditioning device at the time of external charging, and in addition, the vehicle interior can also be preliminarily cooled or heated after the external charging is canceled. Specifically, electric power supplied from a secondary battery is used to operate the pre-air-conditioning device, for a certain period of time from when the external power supply is removed from the vehicle after the external charging ends to when an occupant climbs into the vehicle and the vehicle is ready to operate.

In addition, Japanese Patent Laying-Open No. 2000-78701 (Patent Document 4) discloses an air-conditioning device for an electric vehicle configured to select the air-conditioning capacity in accordance with charging power (charging voltage level) when pre-air-conditioning is carried out at the time of external charging, and thereby, carry out pre-air-conditioning without consuming electric power of a battery even if the charging power is small.

Patent Document 1: Japanese Patent Laying-Open No. 8-65814
Patent Document 2: Japanese Patent Laying-Open No. 8-65815
Patent Document 3: Japanese Patent Laying-Open No. 2001-63347
Patent Document 4: Japanese Patent Laying-Open No. 2000-78701
Non-Patent Document 1: "Electric Vehicle Conductive Charging System, General Requirements," Japan Electric Vehicle Association Standard (Japan Electric Vehicle Standard), Mar. 29, 2001
Non-Patent Document 2: "SAE Electric Vehicle Conductive Charge Coupler," (United States of America), SAE Standards, SAE International, November, 2001

DISCLOSURE OF THE INVENTION

Problems to be Solved by the Invention

Generally, however, charge allowable power of the power storage device varies depending on a state of the power storage device, for example, the remaining capacity (SOC) or the temperature. In particular, if the power storage device is made up of a secondary battery, it is known that the charge allowable power is decreased at an extremely low temperature.

Accordingly, if a vehicle-mounted electric load such as an electric air-conditioning device is operated by using the electric power from the external power supply at the time of external charging in a state where the charge allowable power of the power storage device is low, surplus electric power that cannot be absorbed by the power storage device may be generated within an electrical system of the plug-in vehicle because of a delay in electric power control caused by a delay in communication and the like, when the consumed power of the electric load is decreased due to a change in operating conditions or stop of the operation of the electric load.

The generation of such surplus electric power may result in a malfunction such as overcharging of the power storage device and overvoltage within the electrical system. In the charging control when the vehicle-mounted electric load such as the pre-air-conditioning device is operated at the time of external charging as described in Patent Documents 1 to 4, however, no measures against the generation of the surplus electric power in the foregoing case are mentioned.

The present invention has been made to solve the above-described problems, and an object of the present invention is to, in a vehicle on which a power storage device that can be charged by an external power supply is mounted, prevent the generation of surplus electric power within an electrical system of the vehicle due to a change in the operating state of a vehicle-mounted electric load such as an electric air-conditioning device, when the electric load is operated at the time of external charging.

Means for Solving the Problems

A charging control apparatus for a power storage device according to the present invention is a charging control apparatus for a power storage device mounted on an electric powered vehicle, including: a condition setting unit for setting charge allowable power based on a state of the power storage device; and a drive control unit. The drive control unit stops electric power supply from an external power supply of the electric powered vehicle and drives a vehicle-mounted electric load by electric power supplied from the power storage device, if the charge allowable power is smaller than or equal to a prescribed electric power margin when the vehicle-mounted electric load is operated in an external charging mode in which the power storage device is charged by the external power supply.

A method for controlling charging of a power storage device according to the present invention is a method for controlling charging of a power storage device mounted on an electric powered vehicle, including the steps of: setting charge allowable power based on a state of the power storage device; and stopping electric power supply from an external power supply of the electric powered vehicle and driving a vehicle-mounted electric load by electric power supplied from the power storage device, if the charge allowable power is smaller than or equal to a prescribed electric power margin when the vehicle-mounted electric load is operated in an external charging mode in which the power storage device is charged by the external power supply.

According to the charging control of the power storage device described above, the vehicle-mounted electric load is driven with the electric power supply from the external power supply stopped, if the charge allowable power of the power storage device is low at the time of external charging. Therefore, even if the consumed power of the vehicle-mounted electric load is suddenly decreased due to a change in the operating conditions or stop of the operation, the generation of surplus electric power within the electric powered vehicle can be prevented. In addition, the power storage device is typically formed of a secondary battery. Therefore, when external charging starts at an extremely low temperature, the temperature of the power storage device is raised due to discharge for driving the vehicle-mounted electric load, and thereby, it can also be expected that the charge allowable power is enhanced to promote charging of the power storage device by the external power supply.

Preferably, the electric powered vehicle includes a power feeding line electrically connected to the external power supply via a charging cable and an inlet in the external charging mode, a power line electrically connected to the vehicle-mounted electric load and the power storage device, a charger provided between the power feeding line and the power line, for converting the electric power supplied from the external power supply to electric power with which the power storage device is charged, and outputting the electric power to the power line, and an opening/closing device interposed between and connected to the power feeding line. The drive control unit opens the opening/closing device if the charge allowable power is smaller than or equal to the electric power margin. Or the method for controlling further includes a step of opening the opening/closing device if the charge allowable power is smaller than or equal to the electric power margin.

With such a configuration, the electric power supply from the external power supply can be reliably stopped by opening the opening/closing device, if the charge allowable power of the power storage device is low at the time of external charging.

More preferably, the drive control unit closes the opening/closing device if the charge allowable power increases to larger than or equal to a prescribed value when the vehicle-mounted electric load is driven with the opening/closing device opened. Or the method for controlling further includes a step of closing the opening/closing device if the charge allowable power increases to larger than or equal to a prescribed value when the vehicle-mounted electric load is driven with the opening/closing device opened.

With such a configuration, the electric power supply from the external power supply can be resumed if the charge allowable power increases when the opening/closing device is once opened and the vehicle-mounted electric load is driven by the electric power supplied from the power storage device.

Also preferably, the electric powered vehicle further includes a power feeding line electrically connected to the external power supply via a charging cable and an inlet, a power line electrically connected to the vehicle-mounted electric load and the power storage device, a charger provided between the power feeding line and the power line, for converting the electric power supplied from the external power supply to electric power with which the power storage device is charged, and outputting the electric power to the power line, and an opening/closing device interposed between and connected to the power feeding line, and the charging control apparatus further includes a charging control unit for controlling an operation of the charger such that electric power in accordance with a charging command is supplied from the external power supply. The drive control unit sets the charging command such that the electric power supplied from the external power supply is substantially 0 with the opening/closing device maintained in a closing state, if the charge allowable power is smaller than or equal to the electric power margin. Or the above step of driving includes a step of setting the charging command such that the electric power supplied from the external power supply is substantially 0 with the opening/closing device maintained in a closing state, if the charge allowable power is smaller than or equal to the electric power margin.

More preferably, the charging control unit maintains a power semiconductor switching element included in the charger in an OFF state, if the charging command is set such that the electric power supplied from the external power supply is substantially 0.

With this, by the control of the electric power supplied from the external power supply by the charger, the vehicle-mounted electric load can be driven by the electric power supplied from the power storage device with the electric power supply from the external power supply stopped. In particular, stop/provision of the electric power supply from the external power supply can be selected with the opening/ closing device maintained in the closing state, without opening and closing the opening/closing device. Therefore, the electric power supply can be stably controlled.

Or preferably, in the above electric powered vehicle, the drive control unit sets the charging command such that the electric power supplied from the external power supply is limited to smaller than or equal to electric power obtained by subtracting the electric power margin from the charge allowable power. Or the method for controlling further includes a step of setting the charging command such that the electric power supplied from the external power supply is limited to smaller than or equal to electric power obtained by subtracting the electric power margin from the charge allowable power.

With such a configuration, the electric power control can be implemented, in which the electric power supplied from the external power supply is controlled to limit the electric power supplied from the external power supply if the charge allowable power of the power storage device is low. As a result, the generation of the surplus electric power within the electric powered vehicle can be prevented.

More preferably, the vehicle-mounted electric load is driven by the electric power supplied from both the power storage device and the external power supply, if a requested charging power of the power storage device is 0 and if a requested consumed power of the vehicle-mounted electric load is larger than the electric power supplied from the external power supply in accordance with the charging command. Or the method for controlling further includes a step of driving the vehicle-mounted electric load by the electric power supplied from both the power storage device and the external power supply, if a requested charging power of the power storage device is 0 and if a requested consumed power of the vehicle-mounted electric load is larger than the electric power supplied from the external power supply in accordance with the charging command.

With such a configuration, the driving electric power of the vehicle-mounted electric load can be secured by using the electric power from the power storage device, when the power storage device does not request charging.

More preferably, the condition setting unit further sets discharge allowable power based on the state of the power storage device, and the drive control unit decreases the requested consumed power of the vehicle-mounted electric load if the requested consumed power is larger than a sum of the discharge allowable power and the electric power supplied from the external power supply in accordance with the charging command. Or the method for controlling further includes the steps of setting discharge allowable power based on the state of the power storage device, and decreasing the requested consumed power of the vehicle-mounted electric load if the requested consumed power is larger than a sum of the discharge allowable power and the electric power supplied from the external power supply in accordance with the charging command.

With such a configuration, overdischarge of the power storage device can be prevented if at least a part of the consumed power of the vehicle-mounted electric load is shared by the power storage device.

Preferably, the electric power margin is variably set in accordance with present consumed power of the vehicle-mounted electric load.

With this, it can be determined more precisely whether or not the electric power supply from the external power supply should be stopped, in accordance with the present consumed power of the vehicle-mounted electric load.

Also preferably, the vehicle-mounted electric load includes an electric air-conditioning device.

With this, the generation of the surplus electric power within the electric powered vehicle at the time of pre-air-conditioning by the electric air-conditioning device during external charging can be prevented.

Effects of the Invention

According to the present invention, in the vehicle on which the power storage device that can be charged by the external power supply is mounted, the generation of the surplus electric power within the electrical system of the vehicle due to a change in the operating state of the vehicle-mounted electric load such as the electric air-conditioning device when the electric load is operated at the time of external charging can be prevented.

DESCRIPTION OF THE REFERENCE SIGNS

Figure 1:
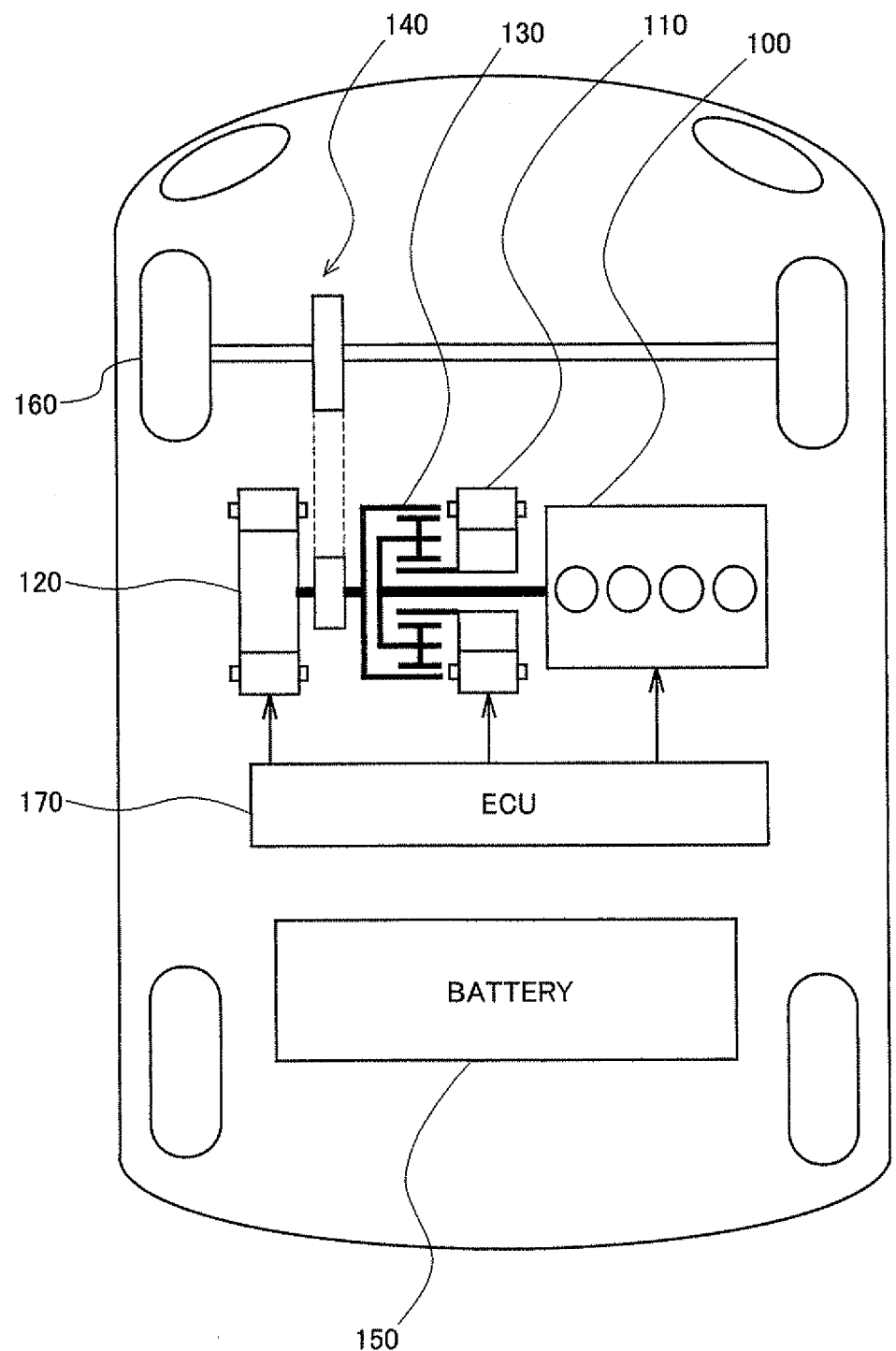
FIG. 1 is a schematic configuration diagram of a plug-in hybrid vehicle.

100 engine; 110 first MG; 112 neutral point (first MG); 120 second MG; 122 neutral point (second MG); 130 power split device; 140 reduction gear; 150 battery (power storage device); 151 voltage sensor (battery); 152 current sensor (battery); 153 temperature sensor (battery); 160 front wheel; 170 ECU; 175 air-conditioning ECU; 171 voltage sensor (Vac); 173 current sensor; 180 voltage sensor (VH); 190, 192, 194, 195 power line; 200 converter; 210 inverter (first MG); 220 inverter (second MG); 210A, 220A upper arm; 210B, 22013 lower arm; 230 DC/DC converter; 240 auxiliary battery; 242 auxiliary machine; 245 electric air-conditioning device; 250 SMR; 260 DFR (opening/closing device); 270 connector (vehicle inlet); 280 LC filter; 282, 284 power feeding line; 290 charger; 292 AC/DC converting circuit; 294 DC/AC converting circuit; 296 isolating transformer; 298 rectifying circuit; 300 charging cable; 310 connector (charging cable); 312 switch; 320 plug; 332 relay; 334 control pilot circuit; 400 outlet; 402 external power supply; 600 external charging control unit; 610 phase detecting unit; 620 sinusoidal wave generating unit; 630 multiplying unit; 640 subtracting unit; 650 current control unit; 1010 SOC calculating unit; 1020 battery condition setting unit; 1100, 1200 A/C drive control unit; 1210 electric power margin setting unit; 1300 inverter control unit; CPLT pilot signal; E0 zero-phase voltage command; FL1 to FL3 flag; Iac current (AC); kv voltage correction gain; MD mode signal (external charging mode); RC charging current command value; PWR charging command; SDFR control signal (DFR); SIV1, SIV2 switching control signal; CNCT connector signal; CPLT pilot signal; MD mode signal (external charging mode); RC charging current command value; RST reset signal; SDFR control signal; SIV1, SIV2 switching control signal; Tb battery temperature; Vac voltage; Vb battery voltage; VH DC voltage (system voltage); Wac requested consumed power (electric air-conditioning device); Wbt output power (battery); Wch requested charging power (battery); Win charge allowable power (battery); Win# charge limitation power (Win−ΔWin); Wout discharge allowable power (battery); Wpi externally-supplied power; Wt, ΔWin electric power margin

BEST MODES FOR CARRYING OUT THE INVENTION

Embodiments of the present invention will be described in detail hereinafter with reference to the drawings. In the following, the same or corresponding portions in the drawings are represented by the same reference characters, and description thereof will not be repeated in principle.

First Embodiment (Overall Configuration)

FIG. 1 is a schematic configuration diagram of a plug-in hybrid vehicle.

A plug-in hybrid vehicle on which a charging system for a power storage device according to the present embodiment is mounted will be described with reference to FIG. 1. This vehicle includes an engine 100, a first MG (Motor Generator) 110, a second MG 120, a power split device 130, a reduction gear 140, and a battery 150 shown as a typical example of "power storage device."

This vehicle travels by using driving force from at least one of engine 100 and second MG 120. Although FIG. 1 shows the plug-in hybrid vehicle by way of illustration, it is described for confirmation that the present invention is also applicable to a power storage device mounted on another plug-in vehicle configured by an electric vehicle or a fuel cell vehicle that travels by using only driving force from a motor.

Engine 100, first MG 110 and second MG 120 are connected with power split device 130 interposed therebetween. Motive power generated by engine 100 is split by power split device 130, into two paths, that is, one path through which the motive power is transmitted via reduction gear 140 to drive front wheel 160, and the other path through which the motive power is transmitted to drive first MG 110 and generate electric power.

First MG 110 is typically a three-phase AC rotating electric machine. First MG 110 generates electric power by using the motive power of engine 100 split by power split device 130. The electric power generated by first MG 110 is used in different ways, depending on a state of traveling of the vehicle and an SOC (State of Charge) of battery 150. For example, at the time of normal traveling, the electric power generated by first MG 110 is used as it is as electric power by which second MG 120 is driven. On the other hand, when SOC of battery 150 is lower than a predetermined value, the electric power generated by first MG 110 is converted from AC to DC by an inverter that will be described hereinafter. Thereafter, a voltage is adjusted by a converter that will be described hereinafter, and the electric power is stored in battery 150.

When first MG 110 acts as a generator, first MG 110 generates negative torque. Here, the negative torque means torque that serves as a load of engine 100. When first MG 110 is supplied with electric power and acts as a motor, first MG 110 generates positive torque. Here, the positive torque means torque that does not serve as the load of engine 100, that is, torque that assists rotation of engine 100. It is noted that the same is applied to second MG 120.

Second MG 120 is typically a three-phase AC rotating electric machine. Second MG 120 is driven by at least one of the electric power stored in battery 150 and the electric power generated by first MG 110.

Driving force of second MG 120 is transmitted to front wheel 160 via reduction gear 140. As a result, second MG 120 assists engine 100 or causes the vehicle to travel by using the driving force from second MG 120. It is noted that a rear wheel may be driven instead of or in addition to front wheel 160.

At the time of regenerative braking of the plug-in hybrid vehicle, second MG 120 is driven by front wheel 160 via reduction gear 140, and second MG 120 is operated as a generator. As a result, second MG 120 is operated as a regenerative brake for converting braking energy to electric power. The electric power generated by second MG 120 is stored in battery 150.

Power split device 130 is formed of a planetary gear including a sun gear, a pinion gear, a carrier, and a ring gear. The pinion gear engages the sun gear and the ring gear. The carrier supports the pinion gear such that the pinion gear can rotate on its axis. The sun gear is coupled to a rotation shaft of first MG 110. The carrier is coupled to a crankshaft of engine 100. The ring gear is coupled to a rotation shaft of second MG 120 and reduction gear 140.

Figure 2:
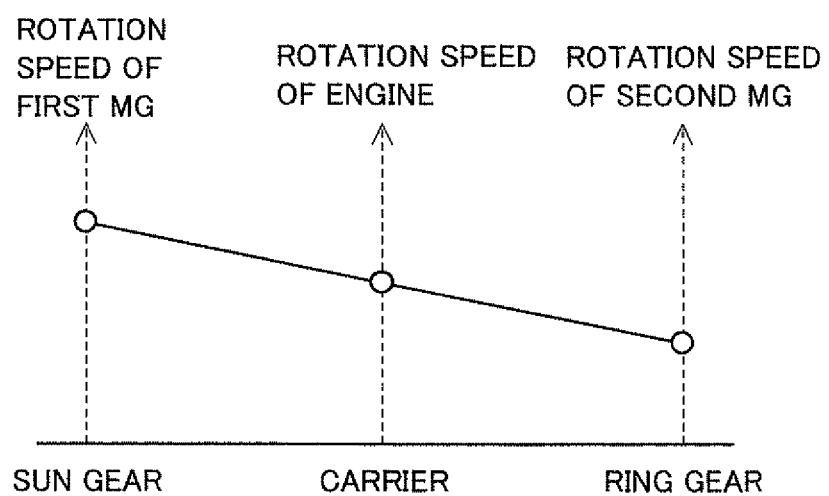
FIG. 2 illustrates a collinear chart of a power split device.

Engine 100, first MG 110 and second MG 120 are coupled with power split device 130 formed of the planetary gear being interposed therebetween, so that the relationship between rotation speeds of engine 100, first MG 110 and second MG 120 is such that they are connected by a straight line in a collinear chart as shown in FIG. 2.

Returning to FIG. 1, battery 150 is an assembled battery configured by integrating a plurality of secondary battery cells to form a battery module and serially connecting a plurality of the battery modules. The voltage of battery 150 is, for example, about 200V. Battery 150 is charged with electric power supplied from a power supply external to the vehicle, in addition to the electric power from first MG 110 and second MG 120.

Engine 100, first MG 110 and second MG 120 are controlled by an ECU (Electronic Control Unit) 170. It is noted that ECU 170 may be divided into a plurality of ECUs.

(Configuration of Electrical System)

Next, a configuration of an electrical system of the plug-in hybrid vehicle including the charging system for the power storage device according to the present embodiment will be described using FIGS. 3 and 4.

Figure 3:
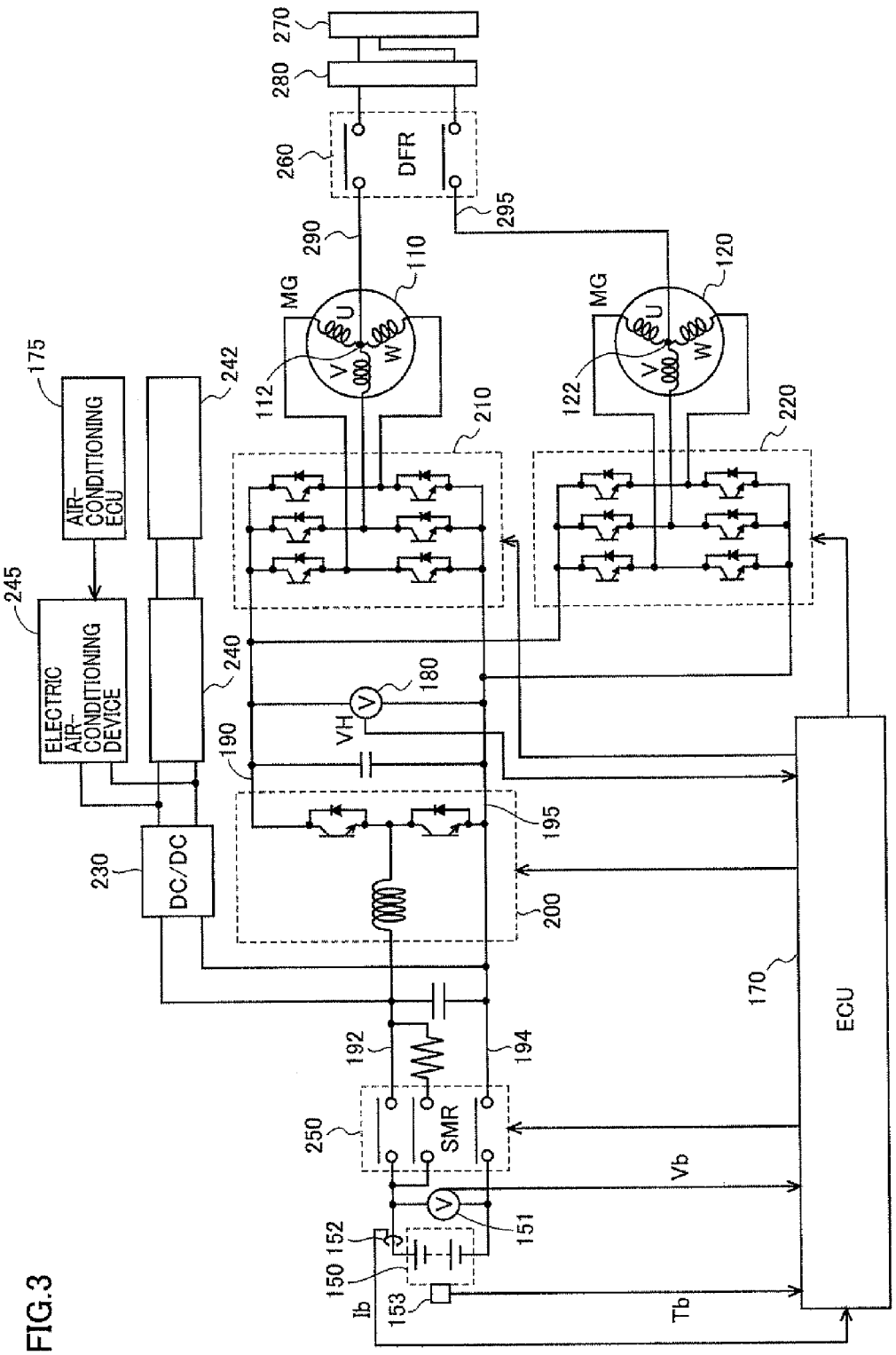
FIG. 3 is a diagram (No. 1) of an electrical system of the plug-in hybrid vehicle.

Referring to FIG. 3, the plug-in hybrid vehicle is provided with a converter 200, a first inverter 210, a second inverter 220, a DC/DC converter 230, an auxiliary battery 240, an SMR (System Main Relay) 250, a DFR (Dead Front Relay) 260, a connector (inlet) 270, and an LC filter 280.

Battery 150 and converter 200 are electrically connected by power lines 192 and 194. SMR 250 is interposed between and connected to power lines 192 and 194. A voltage sensor 151 for detecting an output voltage (battery voltage) Vb, a current sensor 152 for sensing a charging/discharging current (battery current) Ib, and a temperature sensor 153 for sensing a battery temperature Tb are provided for battery 150. Detected battery voltage Vb, battery current Ib and battery temperature Tb are delivered to ECU 170.

DC/DC converter 230 is connected in parallel with converter 200 with respect to battery 150 by power lines 192 and 194. DC/DC converter 230 steps down a DC voltage output by battery 150. Auxiliary battery 240 is charged with an output voltage of DC/DC converter 230. Electric power with which auxiliary battery 240 is charged is supplied to ECU 170 and auxiliary machine 242 such as an electric oil pump.

Furthermore, an electric air-conditioning device 245 operated at least at the time of pre-air-conditioning is driven by the output voltage of DC/DC converter 230. The operation of electric air-conditioning device 245 is controlled by an air-conditioning ECU 175, based on an air-conditioning request (indoor set temperature and the like), the temperature of the vehicle interior, the outside air temperature and the like. In other words, the consumed power of electric air-conditioning device 245 is determined in accordance with an operation instruction from air-conditioning ECU 175. Auxiliary machine 242 and electric air-conditioning device 245 form "vehicle-mounted electric load."

SMR 250 is a relay for switching between a state where battery 150 is connected to the electrical system and a state where battery 150 is disconnected from the electrical system. When SMR 250 is opened, battery 150 is disconnected from the electrical system. On the other hand, when SMR 250 is closed, battery 150 is connected to the electrical system. The state of SMR 250 is controlled by ECU 170. For example, SMR 250 is closed in response to the operation for turning on a power-on switch (not shown) that instructs activation of the system of the plug-in hybrid vehicle, while SMR 250 is opened in response to the operation for turning off the power-on switch. In addition, SMR 250 is also closed at the time of external charging.

Converter 200 includes a reactor, two power semiconductor switching elements (that will also be simply referred to as a switching element hereinafter) connected in series between power lines 190 and 195, an anti-parallel diode provided correspondingly to each switching element, and a reactor. An IGBT (Insulated Gate Bipolar Transistor), a power MOS (Metal Oxide Semiconductor) transistor, a power bipolar transistor and the like can be appropriately employed as the power semiconductor switching element. The reactor has one end connected to the positive electrode side of battery 150, and the other end connected to a connection point between the two switching elements.

ON/OFF of each switching element is controlled by ECU 170 such that a DC voltage (that will also be referred to as "system voltage") VH between power lines 190 and 195 matches a target voltage VR. In other words, converter 200 is configured to be capable of bidirectionally converting electric power between power lines 190, 195 and battery 150 (power lines 192, 194), and controls system voltage VH between power lines 190 and 195 to target voltage VR.

When electric power discharged from battery 150 is supplied to first MG 110 or second. MG 120, the voltage is boosted by converter 200 and is output to between power lines 190 and 195. Conversely, when battery 150 is charged with electric power generated by first MG 110 or second MG 120, the voltage between power lines 190 and 195 is stepped down by converter 200.

System voltage VH between power lines 190 and 195 that connect converter 200 to first inverter 210 and second inverter 220 is detected by voltage sensor 180. The result of detection by voltage sensor 180 is sent to ECU 170.

First inverter 210 is formed of a general three-phase inverter, and includes a U-phase arm, a V-phase arm and a W-phase arm connected in parallel between power lines 190 and 195. Each of the U-, V- and W-phase arms has two switching elements (an upper arm element and a lower arm element) connected in series. An anti-parallel diode is connected to each switching element.

First MG 110 has a U-phase coil, a V-phase coil and a W-phase coil connected in the shape of a star, as a stator winding. One ends of the respective phase coils are connected to one another at a neutral point 112. The other end of each phase coil is connected to a connection point between the switching elements of each phase arm of first inverter 210.

When the vehicle travels, first inverter 210 controls a current or a voltage of each phase coil of first MG 110 such that first MG 110 is operated in accordance with an operation command value (typically, a torque command value) set to generate an output requested for traveling of the vehicle (vehicle drive torque, electric power generation torque and the like). First inverter 210 can carry out bidirectional electric power conversion, that is, the electric power conversion operation by which DC electric power supplied from battery 150 is converted to AC electric power and the AC electric power is supplied to first MG 110 as well as the electric power conversion operation by which AC electric power generated by first MG 110 is converted to DC electric power.

Second inverter 220 is formed of a general three-phase inverter, similarly to first inverter 210. Second MG 120 has a U-phase coil, a V-phase coil and a W-phase coil connected in the shape of a star, as a stator winding, similarly to first MG 110. One ends of the respective phase coils are connected to one another at a neutral point 122. The other end of each phase coil is connected to a connection point of the switching elements of each phase arm of second inverter 220.

When the vehicle travels, second inverter 220 controls a current or a voltage of each phase coil of second MG 120 such that second MG 120 is operated in accordance with an operation command value (typically, a torque command value) set to generate an output requested for traveling of the vehicle (vehicle drive torque, regenerative braking torque and the like). Second inverter 220 can also carry out bidirectional electric power conversion, that is, the electric power conversion operation by which DC electric power supplied from battery 150 is converted to AC electric power and the AC electric power is supplied to second MG 120 as well as the electric power conversion operation by which AC electric power generated by second MG 120 is converted to DC electric power.

In addition, as will be described in detail hereinafter, first inverter 210 and second inverter 220 are controlled to convert an AC voltage between neutral points 112 and 122 to a DC voltage in the external charging mode when battery 150 is charged by an external power supply. In other words, reactor components of first MG 110 and second MG 120 (an inductance of the winding of each phase coil), first inverter 210 and second inverter 220, as well as converter 200 form "charger" for converting an AC voltage from the external power supply to a DC voltage and outputting the DC voltage to between power lines 192 and 194.

Thus, electric air-conditioning device 245 is driven by electric power on power lines 192 and 194. Therefore, in the external charging mode (at the time of pre-air-conditioning), electric air-conditioning device 245 is configured to be capable of being driven by any one of the electric power supplied from battery 150 and the electric power supplied from the external power supply and converted by the above charger.

It is noted that, in each of inverters 210 and 220, a set of the U-phase coil and the U-phase arm, a set of the V-phase coil and the V-phase arm, and a set of the W-phase coil and the W-phase arm each has a configuration similar to that of converter 200. Accordingly, it is understood that first inverter 210 and second inverter 220 also allows voltage conversion in which voltages of neutral points 112 and 122 are boosted and output to the converter 200 side. For example, when battery 150 is charged with the electric power supplied from the power supply external to the vehicle, first inverter 210 and second inverter 220 boosts a voltage. For example, first inverter 210 and second inverter 220 can boost and convert 100V AC to a DC voltage of about 200V.

Next, a configuration for external charging will be described.

Figure 4:
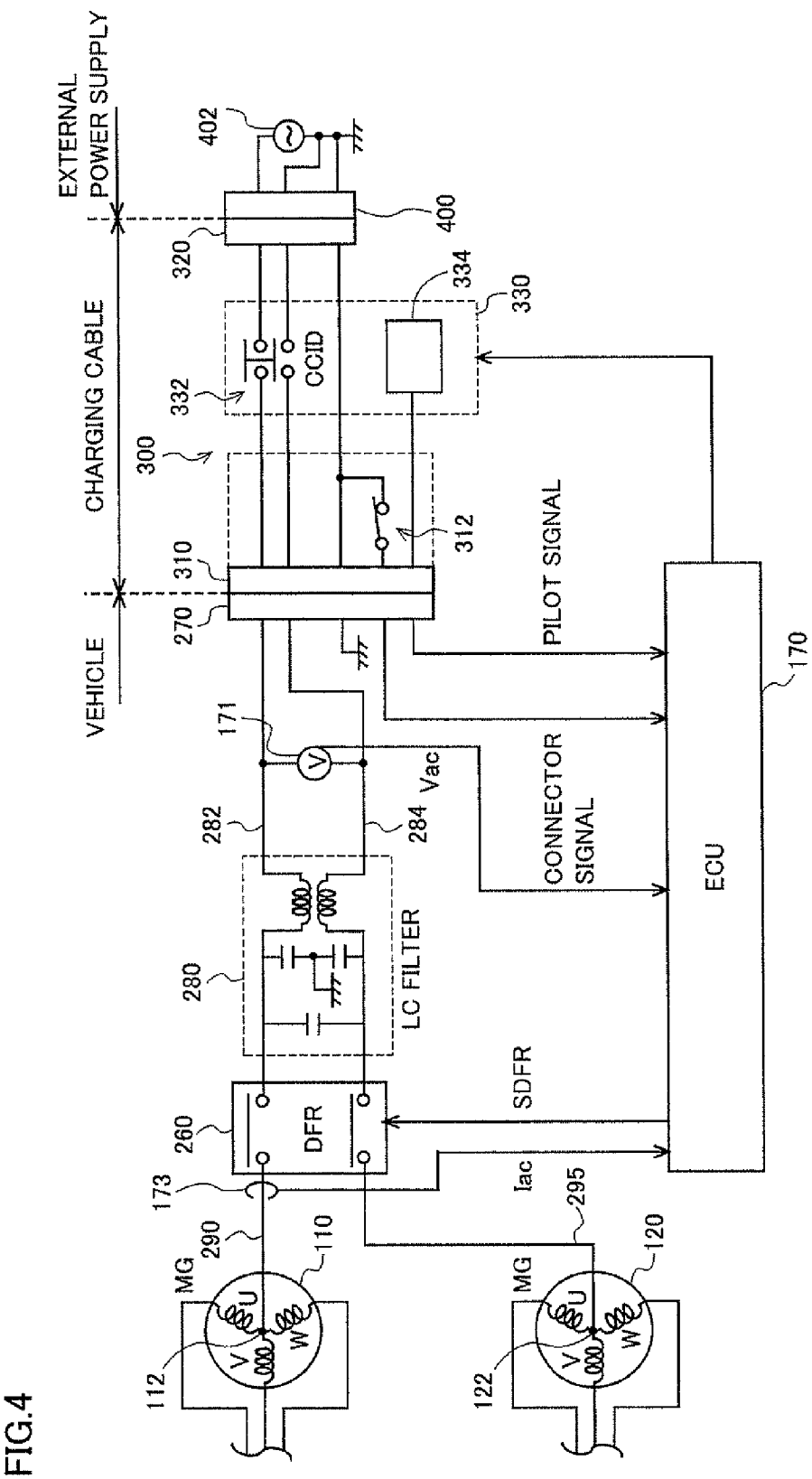
FIG. 4 is a diagram (No. 2) of an electrical system of the plug-in hybrid vehicle.

DFR 260 is interposed between and connected to power feeding lines 282 and 284 that electrically connect neutral point 112 of first MG 110 and neutral point 122 of second MG 120 to the external power supply (FIG. 4). In other words, DFR 260 is a relay ("opening/closing device") for switching connection/disconnection between the electrical system of the plug-in hybrid vehicle and the external power supply. When DFR 260 is opened, the electrical system of the plug-in hybrid vehicle is disconnected from the external power supply. On the other hand, when DFR 260 is closed, the electrical system of the plug-in hybrid vehicle is connected to the external power supply.

Connector 270 is provided, for example, at the side part of the plug-in hybrid vehicle as the inlet on the vehicle side. As will be described hereinafter, a connector of a charging cable for coupling the plug-in hybrid vehicle and the external power supply is connected to connector 270. LC filter 280 is provided between DFR 260 and connector 270.

The configuration for external charging will be described in more detail using FIG. 4.

Referring to FIG. 4, a charging cable 300 for coupling the plug-in hybrid vehicle and the external power supply includes a connector 310, a plug 320, and a CCID (Charging Circuit Interrupt Device) 330. Charging cable 300 corresponds to an EVSE (Electric Vehicle Supply Equipment) in the standard defined in Non-Patent Documents 1 and 2.

Connector 310 of charging cable 300 is connected to connector 270 provided on the plug-in hybrid vehicle. Connector 310 is provided with a switch 312. When switch 312 is closed with connector 310 of charging cable 300 connected to connector 270 provided on the plug-in hybrid vehicle, ECU 170 receives a connector signal CNCT indicating that connector 310 of charging cable 300 is connected to connector 270 provided on the plug-in hybrid vehicle.

Switch 312 is opened and closed in coordination with an anchor fitting (not shown) for anchoring connector 310 of charging cable 300 to connector 270 of the plug-in hybrid vehicle. The anchor fitting (not shown) swings by an operator pressing a button (not shown) provided on connector 310.

For example, when the operator releases the button with connector 310 of charging cable 300 connected to connector 270 provided on the plug-in hybrid vehicle, the anchor fitting engages connector 270 provided on the plug-in hybrid vehicle, and switch 312 is closed. When the operator presses the button, the anchor fitting is disengaged from connector 270, and switch 312 is opened. It is noted that a method for opening and closing switch 312 is not limited thereto.

Plug 320 of charging cable 300 is connected to an outlet 400 provided at a house. AC electric power is supplied from an external power supply 402 of the plug-in hybrid vehicle to outlet 400.

CCID 330 has a relay 332 and a control pilot circuit 334. In a state where relay 332 is opened, a path is interrupted through which electric power is supplied from external power supply 402 of the plug-in hybrid vehicle to the plug-in hybrid vehicle. In a state where relay 332 is closed, electric power can be supplied from external power supply 402 of the plug-in hybrid vehicle to the plug-in hybrid vehicle. ECU 170 controls the state of relay 332 with connector 310 of charging cable 300 connected to connector 270 of the plug-in hybrid vehicle.

Control pilot circuit 334 sends a pilot signal (square-wave signal) CPLT to a control pilot line in a state where plug 320 of charging cable 300 is connected to outlet 400, that is, external power supply 402, as well as where connector 310 is connected to connector 270 provided on the plug-in hybrid vehicle.

The pilot signal oscillates by an oscillator provided within control pilot circuit 334. The pilot signal is output or stopped with a delay by the time period for which the operation of the oscillator delays.

When plug 320 of charging cable 300 is connected to outlet 400, control pilot circuit 334 may output constant pilot signal CPLT even if connector 310 is uncoupled from connector 270 provided on the plug-in hybrid vehicle. ECU 170, however, cannot detect pilot signal CPLT output in a state where connector 310 is uncoupled from connector 270 provided on the plug-in hybrid vehicle.

When plug 320 of charging cable 300 is connected to outlet 400 and connector 310 is connected to connector 270 of the plug-in hybrid vehicle, control pilot circuit 334 causes pilot signal CPLT having a predetermined pulse width (duty cycle) to oscillate.

The plug-in hybrid vehicle is notified of the suppliable current capacity in accordance with the pulse width of pilot signal CPLT. For example, the plug-in hybrid vehicle is notified of the current capacity of charging cable 300. The pulse width of pilot signal CPLT is constant independently of the voltage and the current of external power supply 402.

On the other hand, when a different type of the charging cable is used, the pulse width of pilot signal CPLT may vary. In other words, the pulse width of pilot signal CPLT may be set for each type of the charging cable.

In the present embodiment, in the external charging mode, battery 150 is charged with the electric power supplied from external power supply 402, in a state where the plug-in hybrid vehicle is coupled to external power supply 402 by charging cable 300.

A voltage sensor 171 for detecting an output voltage (AC voltage) of external power supply 402 is provided for power feeding lines 282 and 284 that are electrically connected to external power supply 402 by charging cable 300 and connector 270.

A voltage Vac between power feeding lines 282 and 284 detected by voltage sensor 171 is delivered to ECU 170. In addition, a current sensor 173 is provided for at least one of power feeding lines 282 and 284, and a detected current Iac is delivered to ECU 170.

(Control in External Charging Mode)

Next, control of first inverter 210 and second inverter 220 in the external charging mode of charging battery 150 by external power supply 402 will be described with reference to FIGS. 5 and 6.

Figure 5:
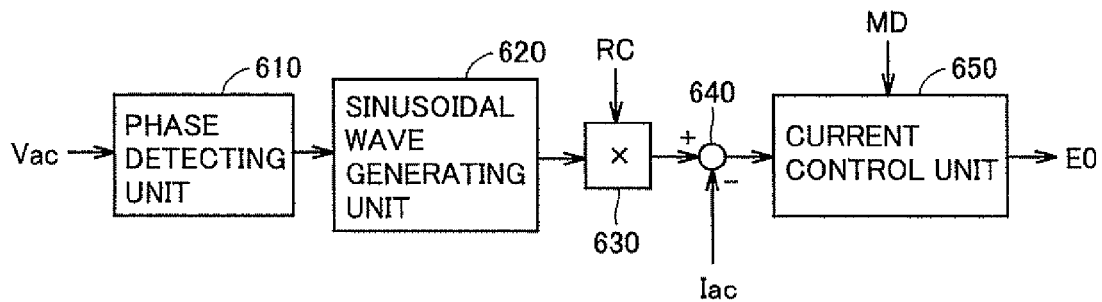
FIG. 5 is a functional block diagram illustrating inverter control in an external charging mode.

FIG. 5 is a functional block diagram illustrating inverter control in the external charging mode.

Referring to FIG. 5, an external charging control unit 600 includes a phase detecting unit 610, a sinusoidal wave generating unit 620, a multiplying unit 630, a subtracting unit 640, and a current control unit 650.

Phase detecting unit 610 detects the zero cross point of voltage Vac, and detects a phase of voltage Vac based on the detected zero cross point. Sinusoidal wave generating unit 620 generates a sinusoidal wave of the same phase as that of voltage Vac, based on the phase of voltage Vac detected by phase detecting unit 610. For example, sinusoidal wave generating unit 620 can generate the sinusoidal wave of the same phase as that of voltage Vac, based on the phase information from phase detecting unit 610, by using a table of a sinusoidal function.

Multiplying unit 630 multiplies a charging current command value RC by the sinusoidal wave from sinusoidal wave generating unit 620, and outputs the result of the operation as a current command value. Subtracting unit 640 subtracts, from the current command output from multiplying unit 630, current Iac detected by current sensor 173, and outputs the result of the operation to current control unit 650. It is noted that charging current command value RC is basically set based on a rated current of the EVSE. Alternatively, charging current command value RC may be variably set in further consideration of the state of battery 150.

When a mode signal MD indicating that the vehicle is in the external charging mode is ON, current control unit 650 generates a zero-phase voltage command E0 for causing current Iac to follow the current command, based on a deviation between the current command output by multiplying unit 630 and current Iac detected by current sensor 173. This zero-phase voltage command E0 is a voltage that is uniformly added to a voltage command for each phase of at least one of first inverter 210 and second inverter 220. This zero-phase voltage command E0 itself does not contribute to the rotation torque of first MG 110 and second MG 120.

Figure 6:
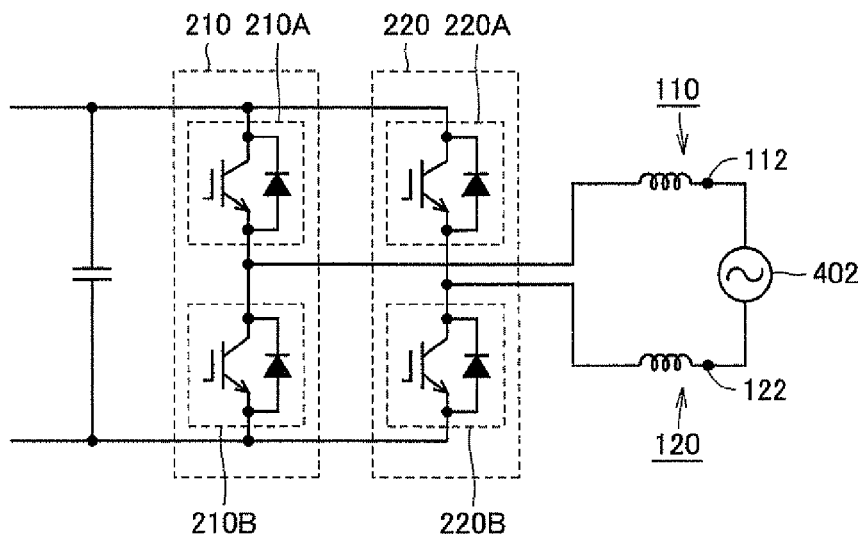
FIG. 6 illustrates a zero-phase equivalent circuit of first and second inverters as well as first and second MGs in the external charging mode.

FIG. 6 illustrates a zero-phase equivalent circuit of first and second inverters 210 and 220 as well as first and second MGs 110 and 120 shown in FIG. 3. Each of first and second inverters 210 and 220 is formed of a three-phase bridge circuit as shown in FIG. 3, and there are eight patterns of on/off combinations of six switching elements in each inverter. In the two of the eight switching patterns, an interphase voltage becomes zero, and such a voltage state is referred to as a zero voltage vector. The zero voltage vector can be understood that the three switching elements of the upper arm are in the same switching state (all on or off), and similarly, the three switching elements of the lower arm are in the same switching state.

At the time of charging of battery 150 by external power supply 402, the zero voltage vector is controlled in at least one of first and second inverters 210 and 220, based on zero-phase voltage command E0 generated by external charging control unit 600 (FIG. 5). Therefore, in this FIG. 6, the three switching elements of the upper arm of first inverter 210 are collectively shown as an upper arm 210A, and the three switching elements of the lower arm of first inverter 210 are collectively shown as a lower arm 210B. Similarly, the three switching elements of the upper arm of second inverter 220 are collectively shown as an upper arm 220A, and the three switching elements of the lower arm of second inverter 220 are collectively shown as lower arm 220B.

As shown in FIG. 6, this zero-phase equivalent circuit can be regarded as a single-phase PWM converter that accepts an input of the single-phase AC electric power provided from external power supply 402 to neutral point 112 of first MG 110 and neutral point 122 of second MG 120. Accordingly, by changing the zero voltage vector in at least one of first and second inverters 210 and 220 based on zero-phase voltage command E0 and controlling switching of first and second inverters 210 and 220 so that first and second inverters 210 and 220 operate as the arms of the single-phase PWM converter, the AC electric power supplied from external power supply 402 can be converted to the DC voltage used to charge battery 150.

It is noted that the inverter control in the external charging mode shown in FIGS. 5 and 6 is only one example. It is described for confirmation that the manner of the inverter control in which the electric power supplied from external power supply 402 is converted to charging power of battery 150 (power storage device) is not specifically limited in application of the present invention.

(Drive Control of Vehicle-Mounted Electric Load in External Charging Mode)

Drive control of the vehicle-mounted electric load in the external charging mode by a charging control apparatus for the power storage device according to the first embodiment will be described hereinafter. It is noted that the control operation that will be described hereinafter is performed when a particular vehicle-mounted electric load configured to be capable of being driven by the electric power supplied from external power supply 402 and battery 150 is operated in the external charging mode, in response to input of an instruction to a not-shown operation switch and the like, timer setting or the like. In the present embodiment, supply of driving electric power of electric air-conditioning device 245 at the time of so-called pre-air-conditioning will be described, wherein the above particular vehicle-mounted electric load is electric air-conditioning device 245.

Figure 7:
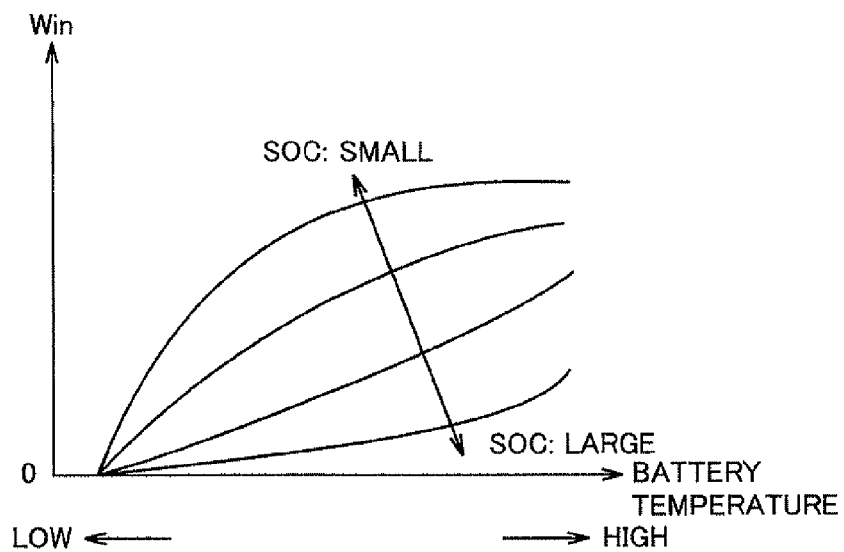
FIG. 7 is a conceptual view illustrating charge allowable power of a battery (power storage device).

FIG. 7 is a conceptual view illustrating charge allowable power of the battery (power storage device).

Referring to FIG. 7, charge allowable power Win of battery 150 is relatively low when battery temperature Tb is low, and is relatively low when the remaining capacity (SOC: State of Charge) is large. In other words, charge allowable power Win is set to low at an extremely low temperature or in a nearly fully charged state, and even if surplus electric power is generated within the electrical system, it is difficult that battery 150 absorbs the surplus electric power.

It is noted that, although not shown, discharge allowable power Wout of battery 150 can be similarly set based on battery temperature Tb and SOC. Discharge allowable power Wout, however, is suppressed to a low value when SOC is small, which is opposite to the SOC-dependent characteristic of charge allowable power Win.

Figure 8:
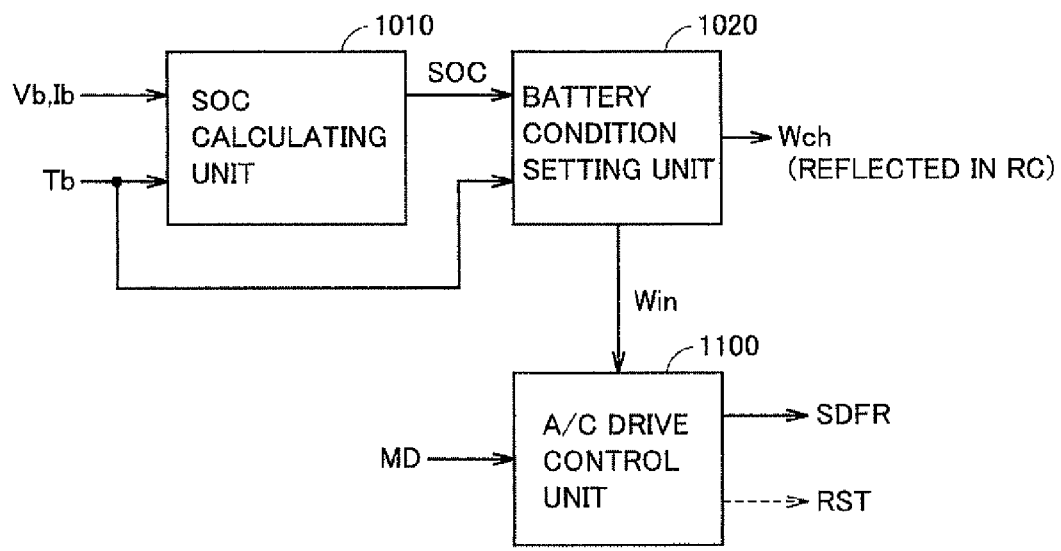
FIG. 8 is a block diagram of a schematic configuration of a charging control apparatus for a power storage device according to a first embodiment of the present invention.

FIG. 8 is a block diagram of a schematic configuration of the charging control apparatus for the power storage device according to the first embodiment of the present invention. The function of each block shown in FIG. 8 can be implemented by hardware or software processing by ECU 170.

Referring to FIG. 8, the charging control apparatus for the power storage device according to the first embodiment includes an SOC calculating unit 1010, a battery condition setting unit 1020 and an A/C drive control unit 1100.

SOC calculating unit 1010 calculates SOC of battery 150 based on battery voltage Vb, battery current Ib and battery temperature Tb indicating the state of battery 150. Battery condition setting unit 1020 generates charge allowable power Win and discharge allowable power Wout of battery 150 in accordance with, for example, the characteristic described using FIG. 7, based on SOC calculated by SOC calculating unit 1010 and battery temperature Tb. Furthermore, battery condition setting unit 1020 sets a requested charging power Wch of battery 150 within the range of charge allowable power Win in the external charging mode. Requested charging power Wch is reflected, for example, in charging current command value RC shown in FIG. 5.

A/C drive control unit 1100 generates a control signal SDFR for controlling opening/closing of DFR 260 and a reset signal RST for initializing a control value within ECU 170, based on mode signal MID indicating that the vehicle is in the external charging mode as well as charge allowable power Win set by battery condition setting unit 1020.

Figure 9:
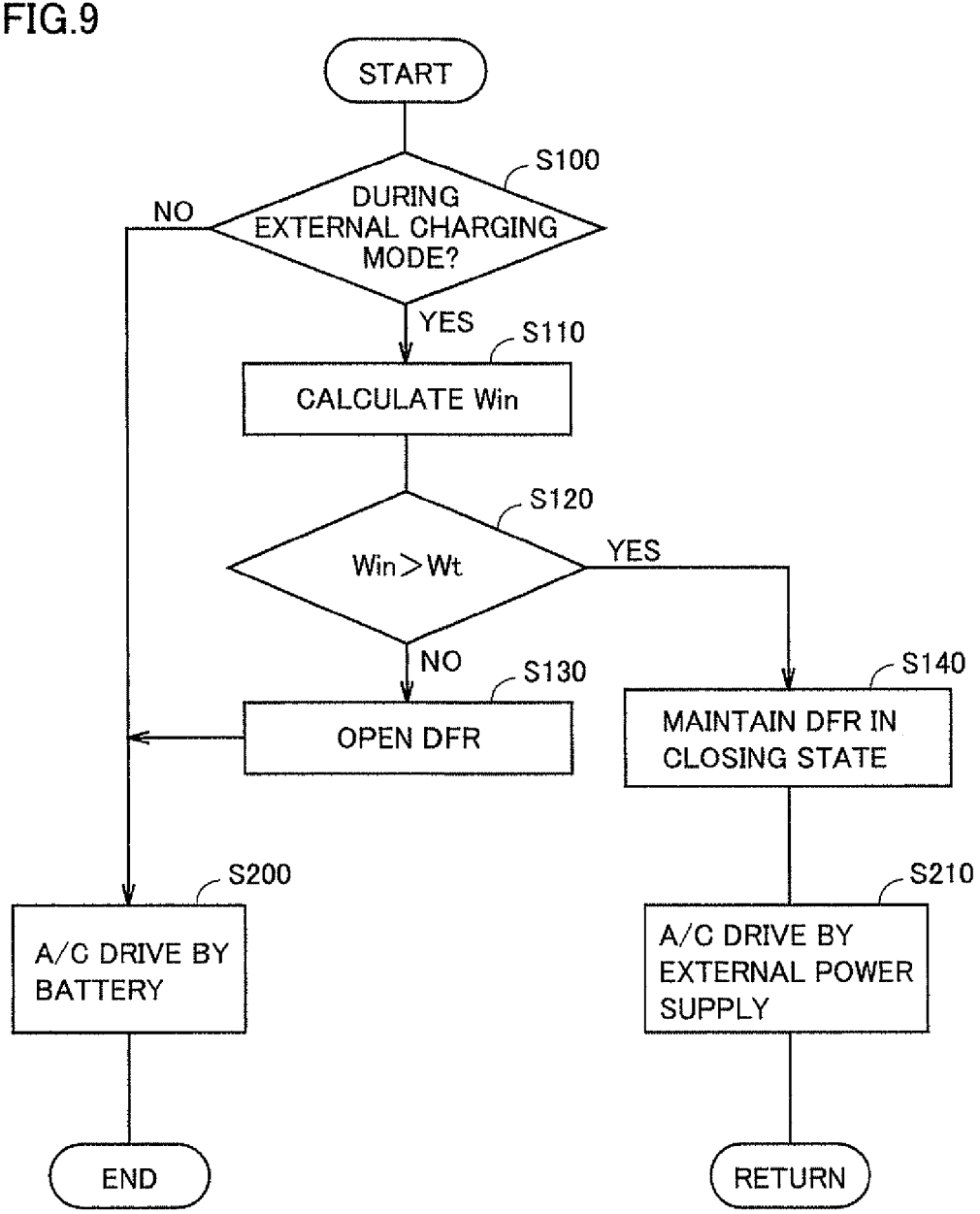
FIG. 9 is a flowchart illustrating a sequence of the control operation by the charging control apparatus for the power storage device shown in FIG. 8.

FIG. 9 is a flowchart illustrating a sequence of the control operation by the charging control apparatus for the power storage device shown in FIG. 8.

Referring to FIG. 9, in step S100, ECU 170 determines whether or not the vehicle is in the external charging mode. If the vehicle is not in the external charging mode (when determined as NO in S100), electric power cannot be supplied from external power supply 402, and therefore, ECU 170 causes the process to proceed to step S200 and drives electric air-conditioning device 245 by electric power supplied from battery 150.

On the other hand, if the vehicle is in the external charging mode (when determined as YES in S100), ECU 170 calculates charge allowable power Win of battery 150 in step S110. The process in step S110 corresponds to the operation of battery condition setting unit 1020 shown in FIG. 8. Furthermore, in step S120, ECU 170 determines whether or not charge allowable power Win calculated in step S110 is larger than a prescribed electric power margin Wt.

Here, when the operating state of electric air-conditioning device 245 varies, a charging command for the external charging is changed in correspondence thereto. By the time the electric power supply from external power supply 402 is actually changed by the electric power control shown in FIGS. 5 and 6, a delay in control caused by a delay in communication and the like occurs. For this reason, when the consumed power of electric air-conditioning device 245 is suddenly decreased such as when the operation of electric air-conditioning device 245 stops, excess electric power is supplied from external power supply 402 because of the delay in control. Accordingly, it is required to set electric power margin Wt such that battery 150 can absorb this excess electric power. Typically, electric power margin Wt is set within the range where battery 150 can be charged with the surplus electric power supplied from external power supply 402 because of the delay in control, by the time the electric power supply from external power supply 402 is stopped by the electric power control when the operation of electric air-conditioning device 245 stops. Accordingly, it is preferable to set electric power margin Wt to, for example, Wc=Wac●k (k: constant) in accordance with present consumed power Wac of electric air-conditioning device 245.

If charge allowable power Win is larger than electric power margin Wt (when determined as YES in S210), ECU 170 causes the process to proceed to step S140 and maintains DFR 260 in the closing state. As a result, in step S210, electric air-conditioning device 245 is driven by the electric power supplied from external power supply 402. In addition, the "return" process is performed and the program is again executed from the beginning after a prescribed cycle has elapsed.

In contrast, if charge allowable power Win is smaller than or equal to electric power margin Wt (when determined as NO in S120), ECU 170 opens DFR 260 in step S130. As a result, the electric power supply from external power supply 402 is stopped (interrupted), and electric air-conditioning device 245 is driven by the electric power supplied from battery 150 in step S200. Then, the sequence of process ends.

As described above, in the charging control apparatus of the charging mechanism according to the first embodiment, if charge allowable power Win of battery 150 is low, the electric power supply from external power supply 402 is stopped and electric air-conditioning device 245 can be driven by the electric power supplied from battery 150.

This can prevent the surplus electric power that cannot be absorbed by battery 150 from being supplied from external power supply 402 even if the consumed power of electric air-conditioning device 245 is suddenly decreased due to stop of the operation, significant decrease in an output of electric air-conditioning device 245 or the like in accordance with the instruction operation, the temperature conditions or the like. On the other hand, electric air-conditioning device 245 can be driven by the electric power supply from external power supply 402 if charge allowable power Win is secured, which can prevent a decrease in electric power stored in battery 150.

Figure 10:
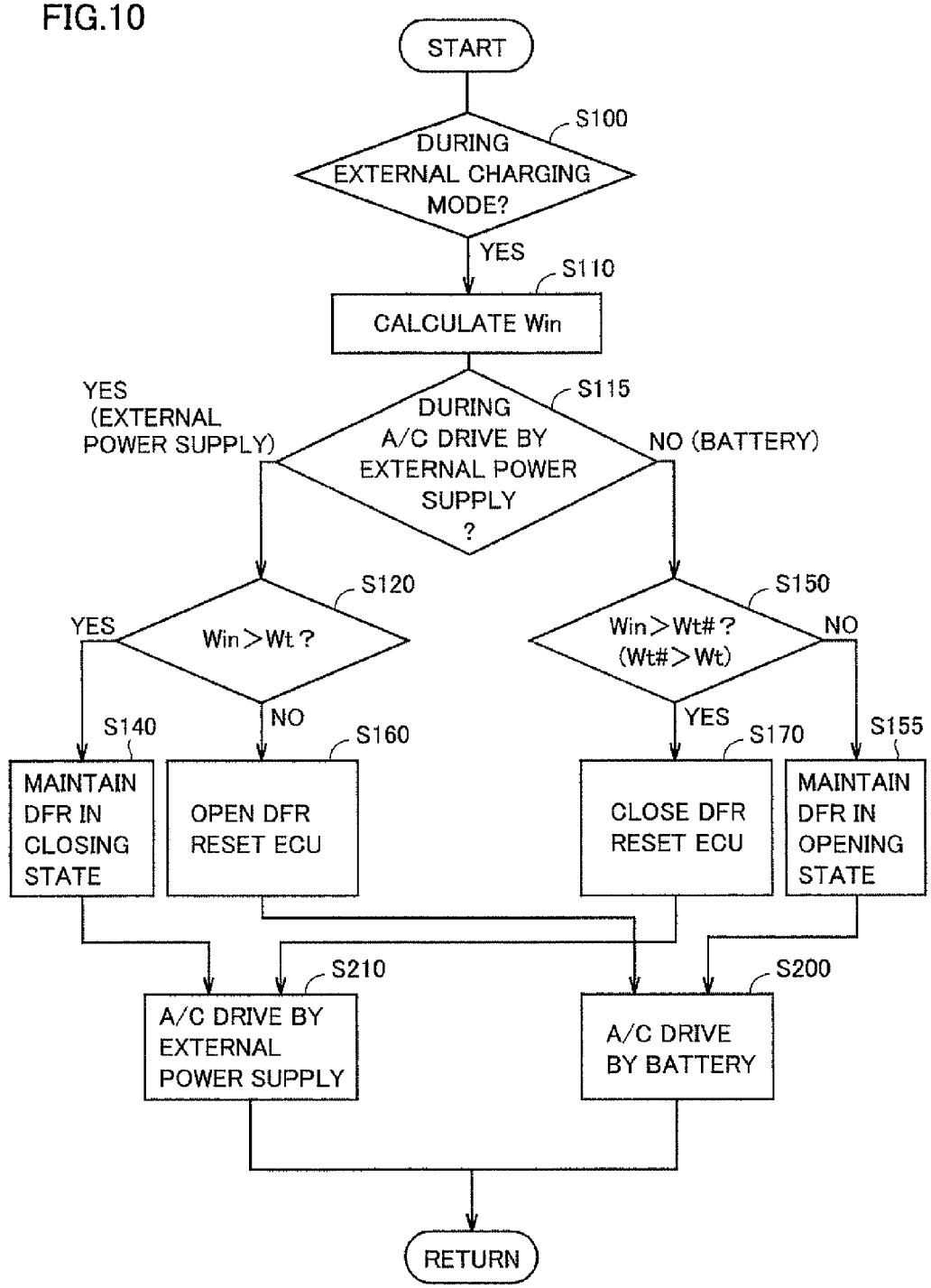
FIG. 10 is a flowchart illustrating a modification of the sequence of the control operation by the charging control apparatus for the power storage device shown in FIG. 8.

FIG. 10 is a flowchart illustrating a modification of the sequence of the control operation by the charging control apparatus for the power storage device shown in FIG. 8. According to the modification shown in FIG. 10, opening/closing of DFR 260 can be reversibly controlled.

Referring to FIG. 10, after the processes in steps S100 and S110 similar to those in FIG. 9 are performed, ECU 170 determines in step S115 whether or not electric air-conditioning device 245 is being driven by the external power supply. For example, when DFR 260 is in the closing state, it is determined as YES in step S115, and when DFR 260 is in the opening state, it is determined as NO in step S115.

If electric air-conditioning device 245 is being driven by the external power supply (when determined as YES in S115), ECU 170 makes the determination in step S120 similar to that in FIG. 9. Then, when determined as YES in step S120, DFR 260 is maintained in the closing state in step S140 and driving of electric air-conditioning device 245 by the electric power supplied from external power supply 402 continues (step S210).

In contrast, when determined as NO in step S120, ECU 170 causes the process to proceed to step S160 and opens DFR 260. Furthermore, an electric power supply path is switched, and with this, the process of resetting internal data according to the electric power control of ECU 170 is further performed. This process corresponds to the operation performed as a result of the generation of reset signal RST in FIG. 8.

When DFR 260 is opened in step S160, electric air-conditioning device 245 is driven by the electric power supplied from battery 150 after that (step S200).

On the other hand, if electric air-conditioning device 245 is being driven by battery 150 in step S115 (when determined as NO in S115), ECU 170 causes the process to proceed to step S150.

ECU 150 compares charge allowable power Win with an electric power margin Wt# in step S150. Electric power margin Wt# in step S150 is set to higher than electric power margin Wt in step S120 (Wt#>Wt). If charge allowable power Win is smaller than or equal to electric power margin W# (when determined as NO in S150), ECU 170 maintains DFR 260 in the opening state in step S155. As a result, driving of electric air-conditioning device 245 by the electric power supplied from battery 150 in a state where the electric power supply from external power supply 402 is stopped continues (step S200). Furthermore, the "return" process is performed and the program is again executed from the beginning after the prescribed cycle has elapsed.

In contrast, if charge allowable power Win is larger than electric power margin Wt# (when determined as YES in S150), that is, if charge allowable power Win increases as a result of driving of electric air-conditioning device 245 by battery 150 in step S200, ECU 170 closes DFR 260 in step S170. Furthermore, the reset process similar to that in step S160 is performed.

When DFR 260 is closed in step S170, the electric power supply from external power supply 402 is resumed and electric air-conditioning device 245 is driven by the external power supply after that (step S210). Furthermore, the execution of the subsequent steps is omitted, the "return" process is performed and the program is again executed from the beginning after the prescribed cycle has elapsed.

As described above, according to the control operation in line with the flowchart shown in FIG. 10, even if DFR 260 is once opened and the electric power supply from external power supply 402 is stopped because charge allowable power Win of battery 150 is low, the electric power supply from external power supply 402 can be resumed if charge allowable power Win increases due to a rise in temperature and the like caused by discharge of battery 150. Stop/provision of the electric power supply from external power supply 402 can be reversibly controlled throughout the external charging mode.

This can prevent the generation of the surplus electric power within the plug-in vehicle when charge allowable power Win of battery 150 is low, and in addition, can facilitate the securing of the driving electric power of electric air-conditioning device 245 and the charging power of battery 150.

Second Embodiment

Figure 11:
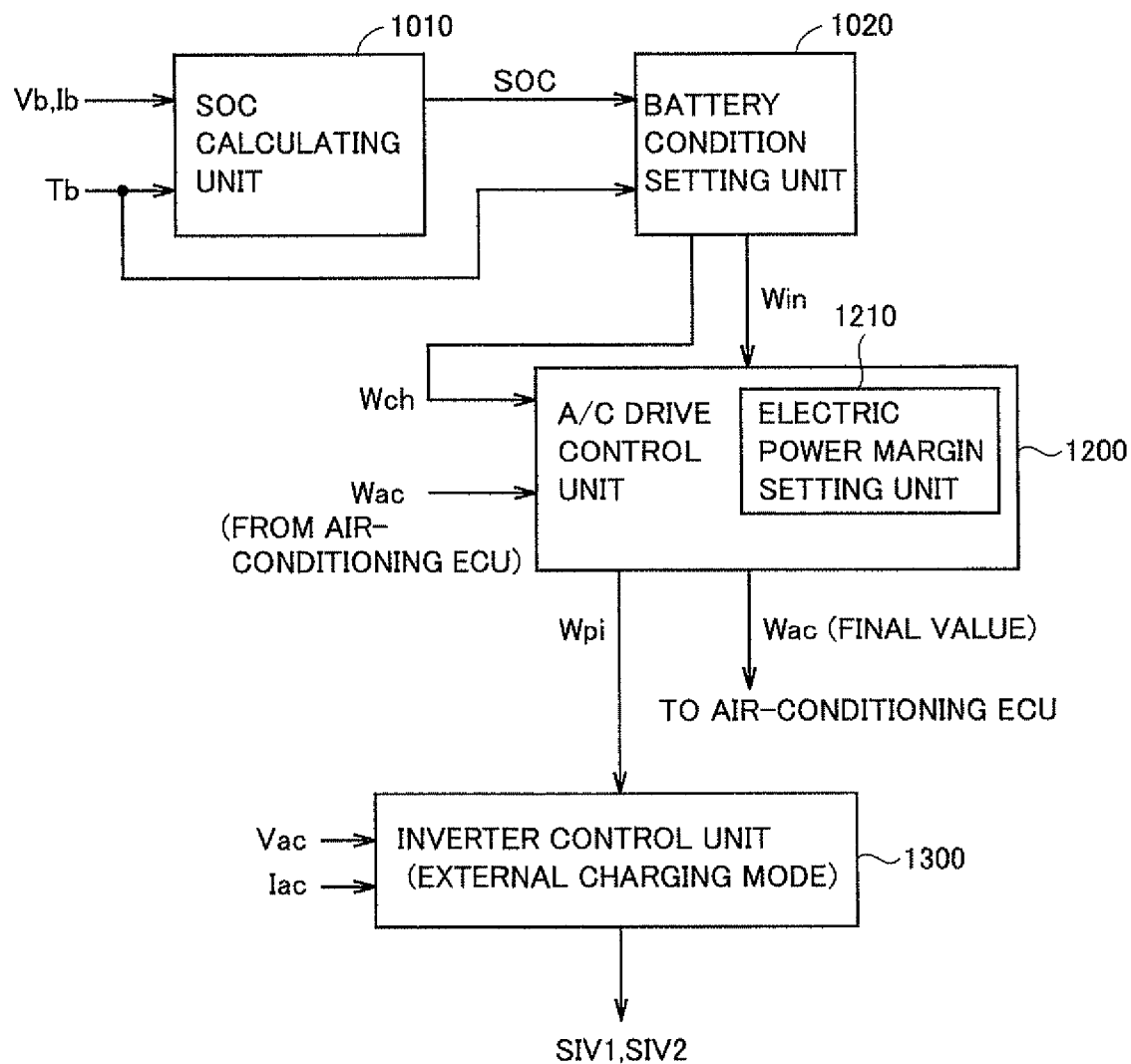
FIG. 11 is a block diagram of a schematic configuration of a charging control apparatus for a power storage device according to a second embodiment of the present invention.

FIG. 11 is a schematic block diagram of a schematic configuration of a charging control apparatus for a power storage device according to a second embodiment.

Referring to FIG. 11, the charging control apparatus for the power storage device according to the second embodiment differs from the configuration according to the first embodiment shown in FIG. 8 in that the charging control apparatus for the power storage device according to the second embodiment is provided with an A/C drive control unit 1200, and further, an inverter control unit 1300, instead of A/C drive control unit 1100.

A/C drive control unit 1200 includes an electric power margin setting unit 1210. A/C drive control unit 1200 receives charge allowable power Win and discharge allowable power Wout as well as requested charging power Wch from battery condition setting unit 1020. Furthermore, A/C drive control unit 1200 receives a requested consumed power Wac of electric air-conditioning device 245 from air-conditioning ECU 175 (FIG. 3). Requested consumed power Wac sets the operating condition of electric air-conditioning device 245 based on an air-conditioning request (indoor set temperature and the like), the outside air temperature and the like, and in addition, calculates requested consumed power Wac as the consumed power in the operating condition.

A/C drive control unit 1200 sets the allocation of the driving electric power of electric air-conditioning device 245, in consideration of charge allowable power Win. Specifically, A/C drive control unit 1200 sets electric power Wpi supplied from external power supply 402 (that will also be referred to as externally-supplied power hereinafter), and in addition, corrects requested consumed power Wac of electric air-conditioning device 245 as required. It is noted that, when requested consumed power Wac is corrected, air-conditioning ECU 175 (FIG. 3) corrects the operating condition of electric air-conditioning device 245 correspondingly to requested consumed power Wac that has been corrected.

Inverter control unit 1300 controls the operation of inverters 210 and 220 in accordance with externally-supplied power Wpi in the external charging mode. Specifically, in the electric power control shown in FIGS. 5 and 6, charging current command value RC is set in accordance with externally-supplied power Wpi, and thereby, switching control signals SIV1 and SIV2 of first inverter 210 and second inverter 220 are generated such that the electric power supplied from external power supply 402 matches Wpi, by feedback control of voltage Vac detected by voltage sensor 171 and current Iac detected by current sensor 173.

Figure 12:
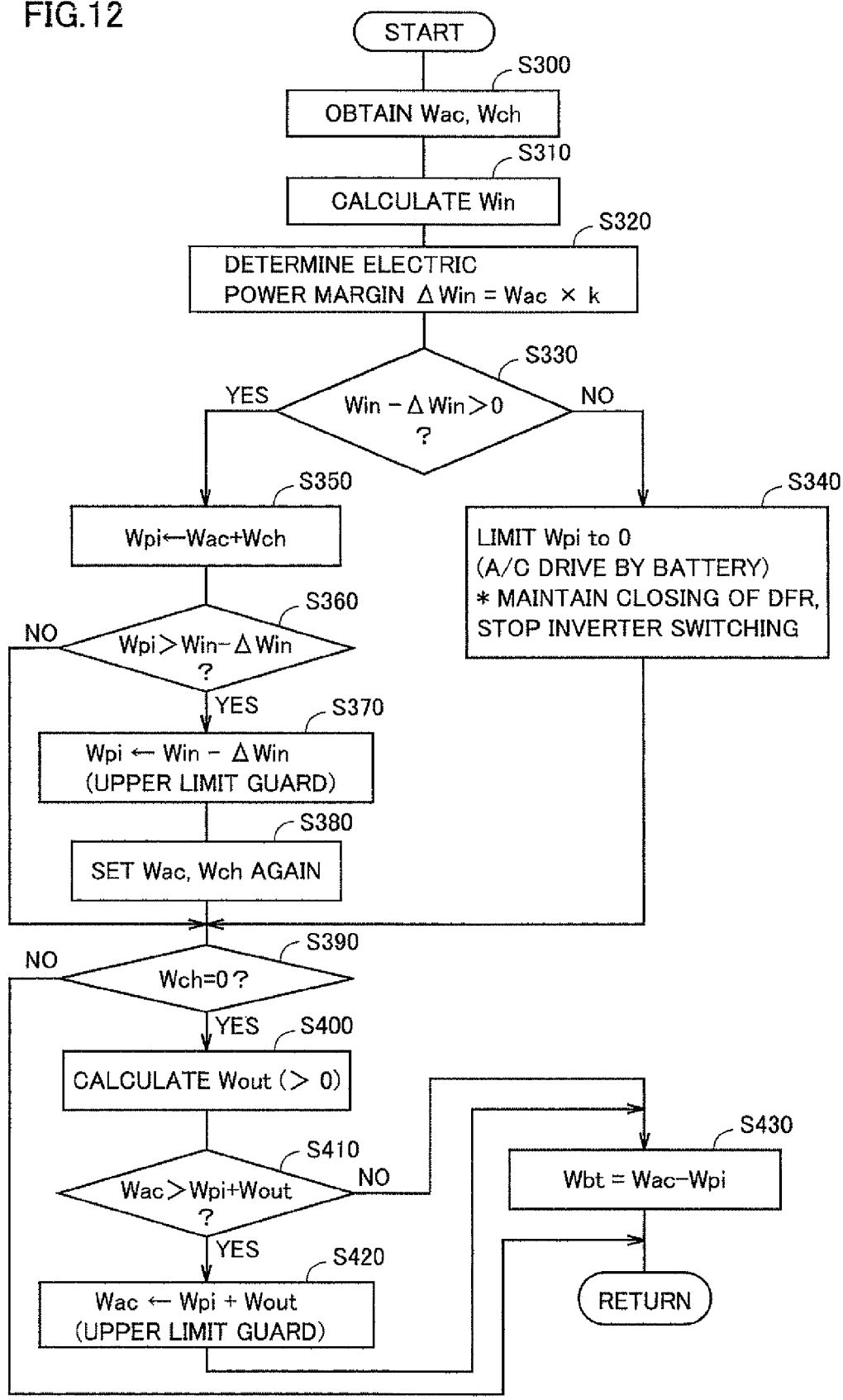
FIG. 12 is a flowchart illustrating a sequence of the control operation by the charging control apparatus for the power storage device according to the second embodiment.

FIG. 12 is a flowchart illustrating a sequence of the control operation by the charging control apparatus for the power storage device according to the second embodiment.

Referring to FIG. 12, in step S300, ECU 170 obtains requested consumed power Wac of electric air-conditioning device 245 and requested charging power Wch of battery 150. Then, in step S310, ECU 170 calculates charge allowable power Win of battery 150.

Furthermore, in step S320, ECU 170 determines electric power margin $\Delta$Win. Electric power margin $\Delta$Win corresponds to electric power margin Wt in the first embodiment. For example, electric power margin $\Delta$Win can be determined as $\Delta$Win=Wac×k.

In step S330, ECU 170 determines whether or not Win−$\Delta$Win>0 is satisfied. In other words, in step S330, it is determined whether or not charge allowable power Win is larger than electric power margin $\Delta$Win, as in step S120 (FIGS. 9 and 10).

If Win−$\Delta$Win≤0 (when determined as NO in S330), ECU 170 limits externally-supplied power Wpi to 0 in step S340, and causes the process to proceed to step S390. If Wpi is set to 0, gates of inverters 210 and 220 are shut off, that is, each switching element is fixed to the OFF state, with DM 260 maintained in the closing state, and thereby, the electric power supply from external power supply 402 is stopped. As a result, electric air-conditioning device 245 is driven by the electric power supplied from battery 150.

As described above, in the charging control according to the second embodiment, the upper limit of externally-supplied power Wpi is set to Win−$\Delta$Win based on charge allowable power Win. If Win−$\Delta$Win≤0, the electric power supply from external power supply 402 is stopped. As a result, electric air-conditioning device 245 is driven by the electric power supplied from battery 150. At this time, battery 150 cannot be charged, and therefore, Wch is set to 0.

On the other hand, if Win−ΔWin>0 (when determined as YES in S330), ECU 170 once sets externally-supplied power Wpi to Wpi=Wac+Wch in step S350. Furthermore, in step S360, it is determined whether or not externally-supplied power Wpi set in step S350 is larger than Win−ΔWin.

If Wpi>Win−ΔWin (when determined as YES in S360), ECU 170 corrects Wpi to Wpi=Win−ΔWin in step S370. As a result, the upper limit of externally-supplied power Wpi is limited to Win−ΔWin as described above. As a result, a total of the sum of original requested consumed power Wac and requested charging power Wch cannot be covered by the electric power supplied from external power supply 402. Therefore, ECU 170 sets requested consumed power Wac and requested charging power Wch again in step S380. Then, the process proceeds to step S390.

In step S380, it is preferable to determine whether higher priority is given to charging of the battery or to pre-air-conditioning, in consideration of SOC of battery 150, the temperature of the vehicle interior, the present time (or the time that has elapsed from when the external charging mode starts) or the like, and to set requested consumed power Wac and requested charging power Wch again based on the priority. For example, if it is necessary to discontinue charging of the battery and preferentially carry out pre-air-conditioning, Wch is set to 0, while Wac is maintained at the original value. If charging of the battery is not stopped, at least one of requested consumed power Wac and requested charging power Wch is corrected from the original values such that Wpi limited in step S370 is divided by Wch and Wac, that is, within the range of Wpi=Wch+Wac (Wpi=Win−ΔWin).

If Wpi≤Win−ΔWin (when determined as NO in S360), ECU 170 skips steps S370 and S380, and causes the process to proceed to step S390. Accordingly, requested consumed power Wac and requested charging power Wch are maintained at the original values.

In step S390, ECU 170 determines whether or not requested charging power Wch=0. If Wch=0, charging of battery 150 is discontinued, and the electric power from battery 150 is used to drive electric air-conditioning device 245. As described above, if the electric power supply from external power supply 402 is stopped in step S340, Wch is set to 0, and therefore, a determination as YES is made in step S390.

When determined as YES in step S390, ECU 170 prevents excessive discharge from battery 150 due to driving of electric air-conditioning device 245, by performing the processes in steps S400 to S430.

In step S400, ECU 170 calculates discharge allowable power Wout (Wout>0) of battery 150. Then, in step S410, ECU 170 compares requested consumed power Wac with a sum of externally-supplied power Wpi and discharge allowable power Wout.

If Wac>Wpi+Wout (when determined as YES in S410), ECU 170 corrects Wac to Wac=Wpi+Wout in step S420. As a result, requested consumed power Wac of electric air-conditioning device 245 is limited such that the upper limit thereof is set to Wpi+Wout. In this case, in step S430, an output power Wbt from battery 150 is set to Wbt=Wac−Wpi. As a result of the above limitation, Wbt<Wout is secured. Furthermore, the "return" process is performed and the program is again executed from the beginning after the prescribed cycle has elapsed.

In contrast, if Wac≤Wpi+Wout (when determined as NO in S410), requested consumed power Wac can be secured within the range of the sum of Wpi (Wpi=0 or Wpi=Win−ΔWin) and discharge allowable power Wout. Accordingly, when determined as NO in S410, ECU 170 skips the process in step S420, and causes the process to proceed to step S430. In other words, requested consumed power Wac and requested charging power Wch that have been determined until step S410 are maintained.

On the other hand, if Wch≠0 (when determined as NO in S390), ECU 170 omits the processes in steps S400 to S430, and the "return" process is performed.

As described above, in the charging control apparatus for the power storage device according to the second embodiment, if charge allowable power Win is low, the electric power supply from external power supply 402 can be stopped and electric air-conditioning device 245 can be driven by the electric power supplied from battery 150, by the electric power control in which externally-supplied power Wpi from external power supply 402 is limited in accordance with charge allowable power Win of battery 150.

In particular, an effect similar to that of the first embodiment can be obtained with DFR 260 maintained in the closing state. As a result, it is not required to open/close the relay (DFR) or reset ECU 170 at the time of switching between stop/provision of the electric power supply from external power supply 402, and the electric power control can be stabilized.

Figure 13:
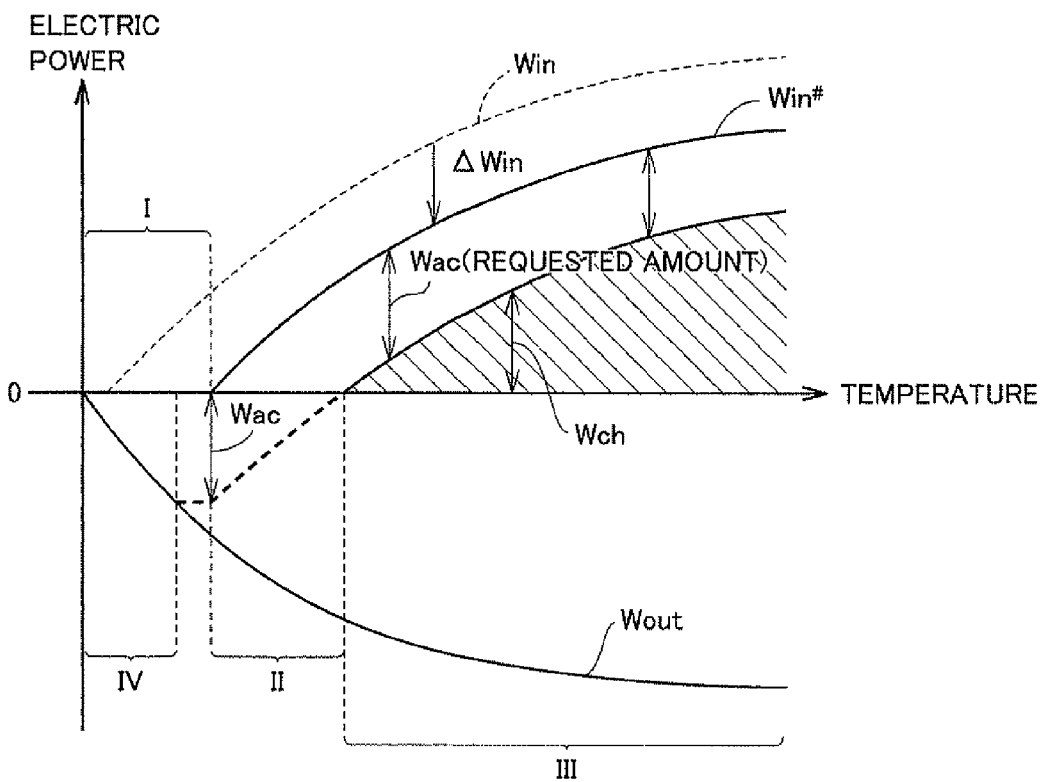
FIG. 13 is a conceptual view (No. 1: when priority is given to pre-air-conditioning) showing the relationship between the charge allowable power by the charging control apparatus for a charging mechanism according to the second embodiment and the driving mode of an electric air-conditioning device.
Figure 14:
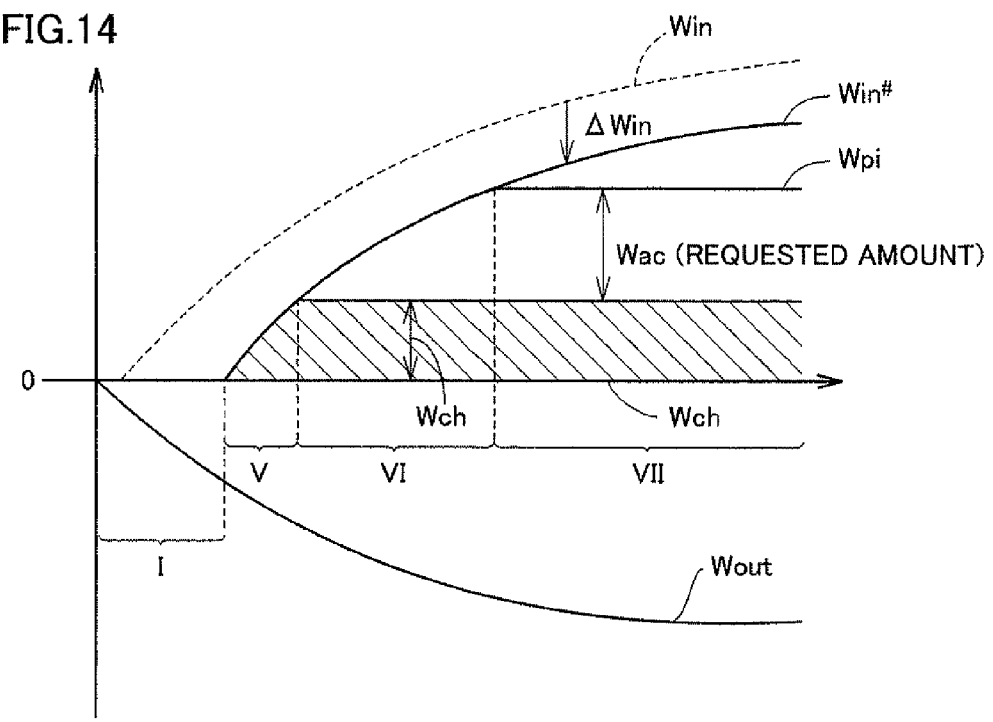
FIG. 14 is a conceptual view (No. 2: when priority is given to charging of a battery) showing the relationship between the charge allowable power by the charging control apparatus for the charging mechanism according to the second embodiment and the driving mode of the electric air-conditioning device.

FIGS. 13 and 14 are conceptual views showing the relationship between the charge allowable power by the charging control apparatus for the charging mechanism according to the second embodiment and the driving mode of the electric air-conditioning device. FIG. 13 shows the case where higher priority is given to pre-air-conditioning, and FIG. 14 shows the case where higher priority is given to charging of the battery.

Referring to FIG. 13, charge allowable power Win is set based on the state of battery 150 (SOC, battery temperature), and a charge limitation power Win# obtained by subtracting electric power margin ΔWin from charging allowable power Win (Win#=Win−ΔWin) is set.

Then, because higher priority is given to pre-air-conditioning, requested consumed power Wac of electric air-conditioning device 245 is secured and the rest is the electric power that can be used to charge battery 150.

In a region I where Win#≤0, the electric power supply from external power supply 402 is stopped. In a region H where Win#>0, but Win#−Wac≤0, charging power of battery 150 cannot be secured, and electric air-conditioning device 245 is driven by a part of the electric power from battery 150. Furthermore, in a region IV where requested consumed power Wac is larger than discharge allowable power Wout, the consumed power of electric air-conditioning device 245 is limited to lower than original requested consumed power Wac (Wac←Wout).

On the other hand, in a region III where Win#−Wac>0, the electric power can be used to charge battery 150. If requested charging power Wch is larger than Win#−Wac, however, Wch is limited to Wch=Win#−Wac.

Referring to FIG. 14, regarding charge allowable power Win and charge limitation power Win# similar to those in FIG. 13, in region I, the electric power supply from external power supply 402 is stopped. In a region V where Win#>0, but Win#≤Wch, charge limitation power Win# is supplied from external power supply 402 and is used to charge battery 150. On the other hand, in this region V, the operation of electric air-conditioning device 245 is stopped.

On the other hand, in a region VI where Wch<Win#<Wch+Wac, requested charging power Wch is secured, Wac is limited to Wac=Win#−Wch, and electric air-conditioning device 245 is operated. Furthermore, in a region VII where Win#≥Wch+Wac, battery 150 can be charged and electric air-conditioning device 245 can be operated in accordance with the original values of requested charging power Wch and requested consumed power Wac.

It is noted that, if charge allowable power Win in regions I, II and the like in FIGS. 13 and 14 is low (for example, at an extremely low temperature), it is expected that charge allowable power Win will increase and move to regions III, V, VI and the like due to a rise in temperature of battery 150 caused by discharge. Accordingly, the control configuration in which the electric power supply from external power supply 402 can be resumed after stop as in the first embodiment (FIG. 10) and the second embodiment allows the promotion of charging of battery 150 even if charge allowable power Win is low.

In addition, an electric load other than the electric air-conditioning device described in the first and second embodiments can also be applied as the vehicle-mounted electric load driven in the external charging mode.

Although the present embodiment has been described based on the configuration in which electric air-conditioning device 245 (vehicle-mounted electric load) is driven by the electric power on power lines 192 and 194 as exemplified in FIG. 3, electric air-conditioning device 245 (vehicle-mounted electric load) can be connected to any position as long as electric air-conditioning device 245 can be driven by both the electric power supplied from battery 150 and the electric power supplied from external power supply 402. For example, electric air-conditioning device 245 (vehicle-mounted electric load) may be electrically connected to power lines 190 and 195. In this case, the reactor components of first MG 110 and second MG 120 (inductance of the winding of each phase coil) as well as first inverter 210 and second inverter 220 configure "charger" for converting the electric power supplied from external power supply 402 to the charging power of battery 150.

In addition, in the present embodiment, a configuration has been exemplified, in which external power supply 402 is connected to neutral points 112 and 122, and the AC electric power from external power supply 402 is converted to the charging power of battery 150 (power storage device) by the reactor components of first MG 110 and second MG 120 (inductance of the winding of each phase coil) as well as first inverter 210 and second inverter 220. The application of the present invention, however, is not limited to such a configuration.

Figure 15:
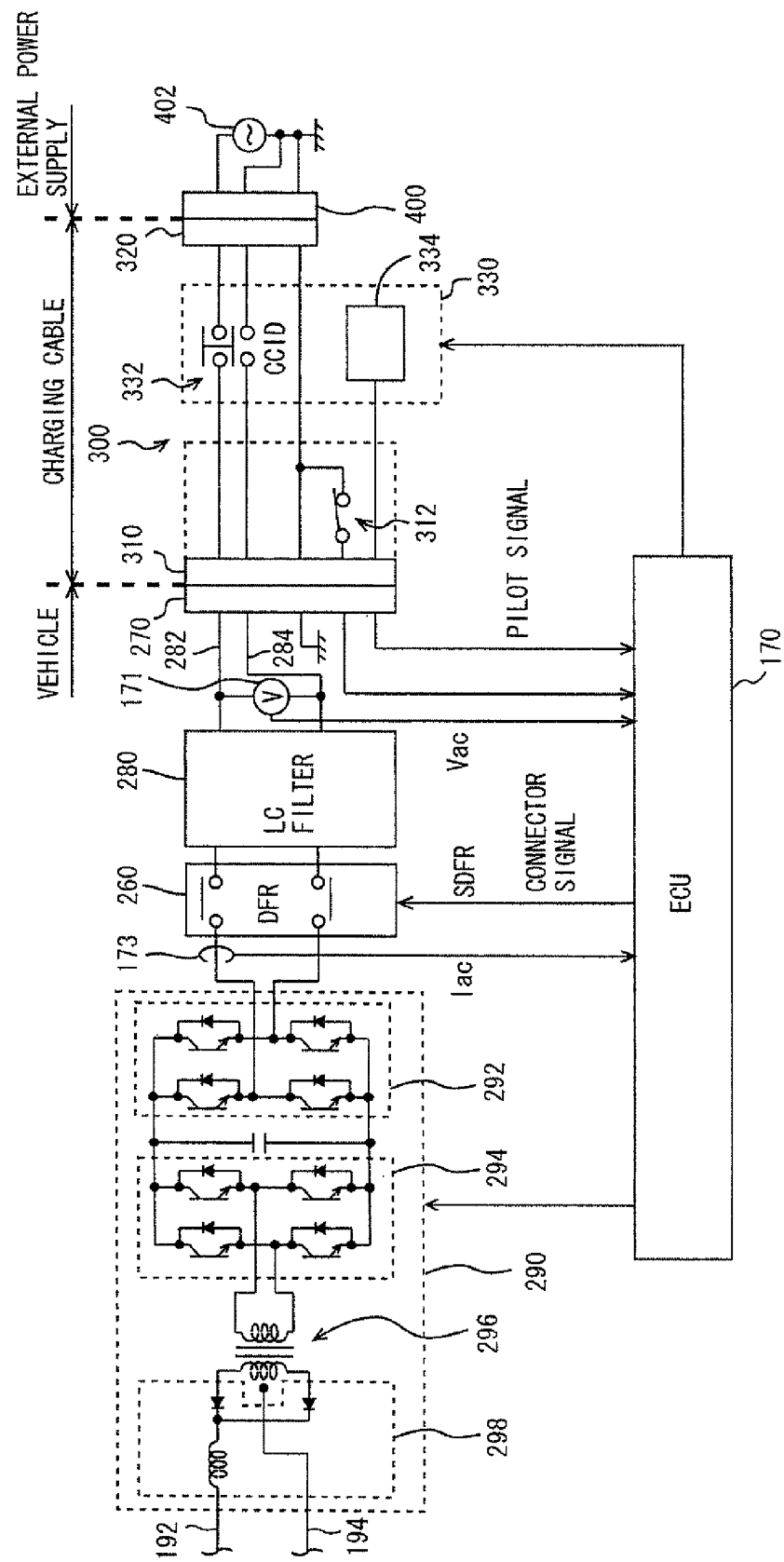
FIG. 15 illustrates an electrical system of a modification of an external charging configuration in the plug-in hybrid vehicle.

For example, the present invention is also applicable to a plug-in vehicle having a configuration in which a charger 290 dedicated to external charging for changing an AC voltage from external power supply 402 to a DC voltage is separately placed between power feeding lines 282, 284 (however, the inner side of the vehicle as compared with DFR 260) and power lines 192, 194 as shown in FIG. 15.

In the plug-in hybrid vehicle including an external charging configuration shown in FIG. 15, battery 150 is charged by using charger 290. Charger 290 is connected between DFR 260 and power lines 192, 194.

Charger 290 includes an AC/DC converting circuit 292, a DC/AC converting circuit 294, an isolating transformer 296, and a rectifying circuit 298. AC/DC converting circuit 292 is formed of a single-phase bridge circuit. AC/DC converting circuit 292 converts AC electric power to DC electric power by controlling on/off of switching elements in accordance with a drive signal from ECU 170. In addition, AC/DC converting circuit 292 also functions as a boost chopper circuit for boosting a voltage by using a coil as a reactor.

DC/AC converting circuit 294 is formed of a single-phase bridge circuit. DC/AC converting circuit 294 converts DC electric power to high-frequency AC electric power by controlling on/off of switching elements in accordance with a drive signal from ECU 170, and outputs the AC electric power to isolating transformer 296.

Isolating transformer 296 includes a core made from a magnetic material as well as a primary coil and a secondary coil wound around the core. The primary coil and the secondary coil are electrically insulated from each other, and are connected to DC/AC converting circuit 294 and rectifying circuit 298, respectively. Isolating transformer 296 converts the high-frequency AC electric power received from DC/AC converting circuit 294 to a voltage level in accordance with the winding ratio of the primary coil and the secondary coil, and outputs the electric power to rectifying circuit 298. Rectifying circuit 298 rectifies the AC electric power output from isolating transformer 296 to DC electric power.

In the external charging mode, ECU 170 controls charger 290 such that the electric power supplied from external power supply 402 matches Wpi, by the feedback control of voltage Vac detected by voltage sensor 171 and current Iac detected by current sensor 173. Specifically, based on the above feedback control, the drive signals are generated to control on/off of the switching elements included in AC/DC converting circuit 292 and DC/AC converting circuit 294. In addition, when externally-supplied power Wpi is limited to 0, ECU 170 fixes each switching element forming AC/DC converting circuit 292 and DC/AC converting circuit 294 to the OFF state, similarly to the control in inverters 110 and 120.

It is noted that charger 290 can be placed between DFR 260 and power lines 190, 195.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A system having a charging control apparatus for a power storage device mounted on an electric powered vehicle, the charging control apparatus comprising:
   a condition setting unit configured to set charge allowable power based on a state of said power storage device; and
   a drive control unit configured to
      stop an electric power supply from an external power supply of said electric powered vehicle and drive a vehicle-mounted electric load by electric power supplied from said power storage device, if said charge allowable power is smaller than or equal to a prescribed electric power margin when said vehicle-mounted electric load is operated in an external charging mode in which said power storage device is charged by said external power supply, and
      drive said vehicle-mounted electric load by the electric power supplied from the external power supply, if said charge allowable power is larger than the prescribed electric power margin when said vehicle-mounted electric load is operated in said external charging mode,
   wherein said drive control unit is configured to reversibly control stop and provision of the electric power supply from the external power supply in said external charging mode.

2. The system according to claim 1, wherein said electric powered vehicle includes
   a power feeding line electrically connected to said external power supply via a charging cable and an inlet in said external charging mode, a power line electrically connected to said vehicle-mounted electric load and said power storage device, a charger provided between said power feeding line and said power line, configured to convert the electric power supplied from said external power supply to electric power with which said power storage device is charged, and output the electric power to said power line, and an opening/closing device interposed between and connected to said power feeding line, and said drive control unit opens said opening/closing device if said charge allowable power is smaller than or equal to said electric power margin.

3. The system according to claim 2, wherein said drive control unit closes said opening/closing device if said charge allowable power increases to larger than or equal to a prescribed value when said vehicle-mounted electric load is driven with said opening/closing device opened.

4. The system according to claim 1, wherein
said electric powered vehicle includes
a power feeding line electrically connected to said external power supply via a charging cable and an inlet,
a power line electrically connected to said vehicle-mounted electric load and said power storage device,
a charger provided between said power feeding line and said power line, configured to convert the electric power supplied from said external power supply to electric power with which said power storage device is charged, and output the electric power to said power line, and
an opening/closing device interposed between and connected to said power feeding line,
said charging control apparatus further comprising:
a charging control unit configured to control an operation of said charger such that electric power in accordance with a charging command is supplied from said external power supply, and
said drive control unit sets said charging command such that the electric power supplied from said external power supply is substantially 0 with said opening/closing device maintained in a closing state, if said charge allowable power is smaller than or equal to said electric power margin.

5. The system according to claim 4, wherein said charging control unit maintains a power semiconductor switching element included in said charger in an OFF state, if said charging command is set such that the electric power supplied from said external power supply is substantially 0.

6. The system according to claim 1, wherein
said electric powered vehicle includes
a power feeding line electrically connected to said external power supply via a charging cable and an inlet,
a power line electrically connected to said vehicle-mounted electric load and said power storage device, and
a charger provided between said power feeding line and said power line, configured to convert the electric power supplied from said external power supply to electric power with which said power storage device is charged, and output the electric power to said power line,
said charging control apparatus further comprising:
a charging control unit configured to control an operation of said charger such that electric power in accordance with a charging command is supplied from said external power supply, and
said drive control unit sets said charging command such that the electric power supplied from said external power supply is limited to smaller than or equal to electric power obtained by subtracting said electric power margin from said charge allowable power.

7. The system according to claim 6, wherein said vehicle-mounted electric load is driven by the electric power supplied from both said power storage device and said external power supply, if a requested charging power of said power storage device is 0 and if a requested consumed power of said vehicle-mounted electric load is larger than the electric power supplied from said external power supply in accordance with said charging command.

8. The system according to claim 7, wherein
said condition setting unit further sets discharge allowable power based on the state of said power storage device, and
said drive control unit decreases the requested consumed power of said vehicle-mounted electric load if said requested consumed power is larger than a sum of said discharge allowable power and the electric power supplied from said external power supply in accordance with said charging command.

9. The system according to claim 1, wherein said electric power margin is variably set in accordance with present consumed power of said vehicle-mounted electric load.

10. The system according to claim 1, wherein said vehicle-mounted electric load includes an electric air-conditioning device.

11. A method for controlling charging of a power storage device mounted on an electric powered vehicle, comprising an electronic control unit (ECU) including control logic configured to perform the following steps of:
setting charge allowable power (Win) based on a state of said power storage device;
stopping an electric power supply from an external power supply of said electric powered vehicle and driving a vehicle-mounted electric load by electric power supplied from said power storage device, if said charge allowable power is smaller than or equal to a prescribed electric power margin when said vehicle-mounted electric load is operated in an external charging mode in which said power storage device is charged by said external power supply; and
driving said vehicle-mounted electric load by the electric power supplied from the external power supply, if said charge allowable power is larger than said prescribed electric power margin when said vehicle-mounted electric load is operated in said external charging mode,
wherein stop and provision of the electric power supply from the external power supply are reversibly controlled in said external charging mode.

12. The method for controlling charging of a power storage device according to claim 11, wherein
said electric powered vehicle includes
a power feeding line electrically connected to said external power supply via a charging cable and an inlet in said external charging mode,
a power line electrically connected to said vehicle-mounted electric load and said power storage device,
a charger provided between said power feeding line and said power line, configured to convert the electric power supplied from said external power supply to electric power with which said power storage device is charged, and output the electric power to said power line, and an opening/closing device interposed between and connected to said power feeding line, and said method for controlling further comprising the step of opening said opening/closing device if said charge allowable power is smaller than or equal to said electric power margin.

13. The method for controlling charging of a power storage device according to claim 12, further comprising the step of closing said opening/closing device if said charge allowable power increases to larger than or equal to a prescribed value when said vehicle-mounted electric load is driven with said opening/closing device opened.

14. The method for controlling charging of a power storage device according to claim 11, wherein said electric powered vehicle includes a power feeding line electrically connected to said external power supply via a charging cable and an inlet, a power line electrically connected to said vehicle-mounted electric load and said power storage device, a charger provided between said power feeding line and said power line, configured to convert the electric power supplied from said external power supply to electric power with which said power storage device is charged, and output the electric power to said power line, an opening/closing device interposed between and connected to said power feeding line, and a charging control unit configured to control an operation of said charger such that electric power in accordance with a charging command is supplied from said external power supply, and said step of driving includes a step of setting said charging command such that the electric power supplied from said external power supply is substantially 0 with said opening/closing device maintained in a closing state, if said charge allowable power (Win) is smaller than or equal to said electric power margin.

15. The method for controlling charging of a power storage device according to claim 14, wherein said charging control unit maintains a power semiconductor switching element included in said charger in an OFF state, if said charging command is set such that the electric power supplied from said external power supply is substantially 0.

16. The method for controlling charging of a power storage device according to claim 11, wherein said electric powered vehicle includes a power feeding line electrically connected to said external power supply via a charging cable and an inlet, a power line electrically connected to said vehicle-mounted electric load and said power storage device, a charger provided between said power feeding line and said power line, configured to convert the electric power supplied from said external power supply to electric power with which said power storage device is charged, and output the electric power to said power line, and a charging control unit configured to control an operation of said charger such that electric power in accordance with a charging command is supplied from said external power supply, and said method for controlling further comprising the step of setting said charging command such that the electric power supplied from said external power supply is limited to smaller than or equal to electric power obtained by subtracting said electric power margin from said charge allowable power.

17. The method for controlling charging of a power storage device according to claim 16, further comprising the step of driving said vehicle-mounted electric load by the electric power supplied from both said power storage device and said external power supply, if a requested charging power of said power storage device is 0 and if a requested consumed power of said vehicle-mounted electric load is larger than the electric power supplied from said external power supply in accordance with said charging command.

18. The method for controlling charging of a power storage device according to claim 17, further comprising the step of:

setting discharge allowable power based on the state of said power storage device; and decreasing the requested consumed power of said vehicle-mounted electric load if said requested consumed power is larger than a sum of said discharge allowable power and the electric power supplied from said external power supply in accordance with said charging command.

19. The method for controlling charging of a power storage device according to claim 11, wherein said electric power margin is variably set in accordance with present consumed power of said vehicle-mounted electric load.

20. The method for controlling charging of a power storage device according to claim 11, wherein said vehicle-mounted electric load includes an electric air-conditioning device.

* * * * *